US012683667B2

(12) United States Patent
Shi et al.

(10) Patent No.: US 12,683,667 B2
(45) Date of Patent: Jul. 14, 2026

(54) COMMUNICATION METHOD AND APPARATUS

(71) Applicant: HUAWEI TECHNOLOGIES CO., LTD., Shenzhen (CN)

(72) Inventors: Hongzhe Shi, Shenzhen (CN); Haicun Hang, Shanghai (CN); Jing Liang, Shanghai (CN); Yiqun Wu, Shanghai (CN); Huangping Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 377 days.

(21) Appl. No.: 18/404,196

(22) Filed: Jan. 4, 2024

(65) Prior Publication Data

US 2024/0154675 A1     May 9, 2024

Related U.S. Application Data

(63) Continuation of application No. PCT/CN2022/099802, filed on Jun. 20, 2022.

(30) Foreign Application Priority Data

Jul. 9, 2021    (CN) .......................... 202110778245.7

(51) Int. Cl.
*H04B 7/06* (2006.01)
*H04L 25/02* (2006.01)

(52) U.S. Cl.
CPC ......... *H04B 7/0634* (2013.01); *H04B 7/0626* (2013.01); *H04L 25/0248* (2013.01)

(58) Field of Classification Search
CPC .. H04B 7/0634; H04B 7/0626; H04B 7/0663; H04L 25/0248; H04L 25/0254; H04L 5/0048; H04L 5/0091; H04W 24/02
See application file for complete search history.

(56) References Cited

U.S. PATENT DOCUMENTS

2023/0388160 A1* 11/2023 Lee ...................... H04L 25/0254
2023/0412227 A1* 12/2023 Abebe ................... H04L 1/0026

FOREIGN PATENT DOCUMENTS

CN        110350958 A    10/2019
WO     2020180221 A1     9/2020

OTHER PUBLICATIONS

3rd Generation Partnership Project; Technical Specification Group Radio Access Network; NR; Physical layer procedures for data (Release 16), 3GPP TS 38.214 V16.6.0 (Jun. 2021), Technical Specification, total 172 pages.

(Continued)

*Primary Examiner* — Hashim S Bhatti
(74) *Attorney, Agent, or Firm* — Rimon PC

(57)     ABSTRACT

Embodiments of this application provide a communication method and an apparatus. A terminal device may measure a downlink reference signal, to obtain third information of a downlink channel. The terminal device may then determine first information and first scenario-related information of the downlink channel based on the third information, and send the first information and the first scenario-related information to a network device. The network device determines second information based on the first scenario-related information and the first information, where the second information may be considered as reconstructed third information. The third information is reconstructed based on the scenario-related information, so that reconstruction precision of the third information can be improved.

20 Claims, 14 Drawing Sheets

(56)          References Cited

OTHER PUBLICATIONS

3rd Generation Partnership Project; Technical Specification Group
Radio Access Network; NR; Radio Resource Control (RRC) pro-
tocol specification (Release 16), 3GPP TS 38.331 V16.5.0 (Jun.
2021), Technical Specification, total 959 pages.

* cited by examiner

COMMUNICATION METHOD AND APPARATUS

CROSS-REFERENCE TO RELATED APPLICATION

This application is a continuation of International Application No. PCT/CN2022/099802, filed on Jun. 20, 2022, which claims priority to Chinese Patent Application No. 202110778245.7, filed on Jul. 9, 2021. The disclosures of the aforementioned applications are hereby incorporated by reference in their entireties.

TECHNICAL FIELD

Embodiments of this application relate to the field of communication technologies, and in particular, to a communication method and an apparatus.

BACKGROUND

In a $5^{th}$ generation (5G) communication system, there are higher requirements on system capacity, spectral efficiency, and the like. Application of massive multiple-input multiple-output (MIMO) technology plays an important role in improving the spectral efficiency of the system. A base station may simultaneously provide high-quality services for more user equipment (UEs) by using massive MIMO technology. To implement downlink massive MIMO, the base station precodes downlink data sent to the UEs. Spatial multiplexing may be performed through precoding to ensure that interference between the UEs is minimized and a signal-to-interference-plus-noise ratio (SINR) of a receiver is increased, thereby increasing a system throughput. The premise that precoding can be accurately performed by the base station is based on the base station being able to obtain related information of a downlink channel, for example, channel state information (CSI). How the base station obtains the related information of the downlink channel is a technical problem to be resolved in embodiments of this application.

SUMMARY

Embodiments of this application provide a communication method and an apparatus, so that a network device can obtain related information of a downlink channel.

According to a first aspect, a communication method is provided. The method may be performed by a network device, may be performed by a component (a processor, a chip, another component) configured in the network device, may be performed by a software module, or the like. The method includes: receiving first information and first scenario-related information of a downlink channel from a terminal device; and determining second information of the downlink channel based on the first scenario-related information and the first information.

According to the foregoing design, the network device may reconstruct related information of the downlink channel, namely, the second information, based on scenario-related information corresponding to the downlink channel, to improve precision of reconstructing information by the network device.

It should be noted that in this application, an example in which the network device reconstructs the related information of the downlink channel based on the scenario-related information is used, but the application is not limited to this.

For example, the terminal device may also reconstruct related information of an uplink channel based on scenario-related information.

In a first design, the first scenario-related information indicates identification information of a scenario corresponding to the downlink channel.

In the first design, at least one set of reference networks may be deployed on a side of the terminal device and a side of the network device side. Each set of reference networks includes a pair of an encoder and a decoder. Each set of reference networks may correspond to a different scenario. In the first design, the first scenario-related information may be identification information of a scenario, and the terminal device side performs encoding by using a first encoder corresponding to the current scenario. The side of network device performs decoding by using a first decoder corresponding to the current scenario. Because both the first encoder and the first decoder correspond to the current downlink channel, a coding and decoding process matches the current downlink channel, and decoding precision of the network device is subsequently improved, thereby improving precision of reconstructing the related information of the downlink channel.

For the first design, the determining second information of the downlink channel based on the first scenario-related information and the first information includes: determining a first decoder in at least one decoder based on the first scenario-related information; and obtaining the second information of the downlink channel based on the first information and the first decoder.

For the first design, the obtaining the second information of the downlink channel based on the first information and the first decoder includes: obtaining a first weighting coefficient matrix based on the first information and the first decoder, where the first weighting coefficient matrix is a real coefficient matrix or a complex coefficient matrix: for example, the first information may be input into the first decoder, and an output of the first decoder may be the first weighting coefficient matrix; and performing space-frequency joint projection inverse transform on a complex coefficient matrix or a complex coefficient vector corresponding to the first weighting coefficient matrix, to determine the second information.

According to the foregoing design, the network device may directly input the first information into the first decoder, or may transform the first information and then input the first information into the first decoder. The output of the first decoder may be the first weighting coefficient matrix. The network device performs space-frequency joint projection inverse transform on the complex coefficient matrix or the complex coefficient vector corresponding to a first weighting coefficient matrix, to determine the second information. The second information may be considered as reconstructed third information. The third information is information obtained by the terminal device by measuring a downlink reference signal. According to the foregoing design, a decoding operation is performed by the first decoder corresponding to the scenario of the current downlink channel, so that decoding precision can be improved, thereby improving precision of reconstructing the third information.

In the first design, the second information includes an eigen-subspace matrix H' of the downlink channel, and the determined eigen-subspace matrix H' of the downlink channel satisfies the following formula:

$$H' = \sum_{k=1}^{K}\sum_{l=1}^{L} C(f_{dec-scen}(la)) * U_{1,k} * U_{2,l}^*$$

H' represents the eigen-subspace matrix of the downlink channel. $U_{1,k}$ represents a $k^{th}$ column vector in a basis vector set in a spatial domain direction, k=1, . . . , K, the basis vector set in the spatial domain direction includes K column vectors, and K is a positive integer. $U^*_{2,1}$ represents conjugate transpose on an $1^{th}$ column vector in a basis vector set in a frequency domain direction, l=1, . . . , L, the basis vector set in the frequency domain direction includes L column vectors, and L is a positive integer. la represents the first information. The function $f_{dec-scen}(\cdot)$ represents the first decoder corresponding to the first scenario-related information, and the first decoder is configured to perform decoding based on the first information. The function $C(\cdot)$ represents an output of the first decoder as a complex coefficient matrix. Optionally, in this design, the output of the first decoder may be a real coefficient matrix or a complex coefficient matrix. If the output of the first decoder is the real coefficient matrix, the foregoing function $C(\cdot)$ may transform the real coefficient matrix output by the first decoder into the complex coefficient matrix. Alternatively, if the output of the first decoder is directly the complex coefficient matrix, the function $C(\cdot)$ does not need to perform transformation.

In the foregoing design, an example in which space-frequency joint projection inverse transform is performed on the complex coefficient matrix corresponding to the first weighting coefficient matrix output by the first decoder is used for description.

Alternatively, the determined eigen-subspace matrix H' of the downlink channel satisfies the following formula:

$$H' = \sum_{j=1}^{J} C(f_{dec-scen}(la))|_j * U_{1,j} * U_{2,j}^*$$

H' represents the eigen-subspace matrix of the downlink channel. la represents the first information. The function $f_{dec-scen}(\cdot)$ represents the first decoder corresponding to the first scenario-related information, and the first decoder is configured to perform decoding based on the first information. The function $C(\cdot)$ represents an output of the first decoder as a complex coefficient matrix. $C(\cdot)|_j$ represents a $j^{th}$ complex coefficient in the complex coefficient matrix, j=1, . . . , J, the complex coefficient matrix includes J complex coefficients, $J \leq K \times L$, and K and L are positive integers. $U_{1,j}$ represents a column vector that is in a basis vector set in a spatial domain direction and that corresponds to $C(\cdot)|j$, and the basis vector set in the spatial domain direction includes K column vectors. $U^*_{2,j}$ represents conjugate transpose on a column vector that is in a basis vector set in a frequency domain direction and that corresponds to $C(\cdot)|_j$, and the basis vector set in the frequency domain direction includes L column vectors. Optionally, the output of the first decoder may be a real coefficient matrix or a complex coefficient matrix. If the output of the first decoder is the real coefficient matrix, the foregoing function $C(\cdot)$ may transform the real coefficient matrix output by the first decoder into the complex coefficient vector. Alternatively, if the output of the first decoder is directly the complex coefficient matrix, the function $C(\cdot)$ does not need to perform transformation.

In the foregoing design, an example in which space-frequency joint projection inverse transform is performed on the complex coefficient vector corresponding to the first weighting coefficient matrix output by the first decoder is used for description.

In a second design, the first scenario-related information indicates N probability values, and each of the N probability values corresponds to one scenario. Optionally, a sum of the N probability values is less than or equal to 1.

In the second design, an encoder and a decoder may be separately deployed on a side of the terminal device and a side of the network device. The encoder and the decoder are respectively referred to as a second encoder and a second decoder. In the second decoder, in addition to the first information, the first scenario-related information corresponding to the current downlink channel is further input. A neural network in the second decoder may be converged by using the first scenario-related information, thereby improving precision of reconstructing the second information.

For the second design, the determining second information of the downlink channel based on the first scenario-related information and the first information includes: obtaining a second weighting coefficient matrix based on the first scenario-related information, the first information, and a second decoder, where the second weighting coefficient matrix is a complex coefficient matrix or a real coefficient matrix; and performing space-frequency joint projection inverse transform on a complex coefficient matrix or a complex coefficient vector corresponding to the second weighting coefficient matrix, to determine an eigen-subspace matrix H' of the downlink channel.

According to the foregoing design, the first scenario-related information and the first information may be directly input into the second decoder, or the first scenario-related information and the first information may be transformed, and transformed information is input into the second decoder. An output of the second decoder is the second weighting coefficient matrix. Space-frequency joint projection inverse transform is performed on the complex coefficient matrix or the complex coefficient vector corresponding to the second weighting coefficient matrix, to obtain the eigen-subspace matrix of the downlink channel H' through reconstruction. Because the scenario-related information corresponding to the current downlink channel is added to an input of the second decoder, decoding precision of the second decoder can be improved, thereby improving precision of reconstructing the eigen-subspace matrix H' of the downlink channel by the network device.

In the second design, the second information includes an eigen-subspace matrix H' of the downlink channel, and the determined eigen-subspace matrix H' of the downlink channel satisfies the following formula:

$$H' = \sum_{k=1}^{K}\sum_{l=1}^{L} C(f_{dec}(la, \text{ latents})) * U_{1,k} * U_{2,l}^*$$

H' represents the eigen-subspace matrix of the downlink channel. $U_{1,k}$ represents a $k^{th}$ column vector in a basis vector set in a spatial domain direction, k=1, . . . , K, the basis vector set in the spatial domain direction includes K column vectors, and K is a positive integer. $U^*_{2,1}$ represents conjugate transpose on an $1^{th}$ column vector in a basis vector set in a frequency domain direction, l=1, . . . , L, the basis vector set in the frequency domain direction includes L column vectors, and L is a positive integer. la represents the first information. latents represents the first scenario-related information, indicating a group of probabilities. The function $f_{dec}(\cdot)$ represents the second decoder, and the second decoder is configured to perform decoding based on the first information and the first scenario-related information. The function $C(\cdot)$ represents an output of the second decoder as a complex coefficient matrix. Optionally, the output of the second decoder may be a real coefficient matrix or a complex coefficient matrix. If the output of the second decoder is the real coefficient matrix, the foregoing function $C(\cdot)$ may transform the real coefficient matrix output by the second decoder into the complex coefficient matrix. Alternatively, if the output of the second decoder is directly the complex coefficient matrix, the function $C(\cdot)$ does not need to perform transformation.

In the foregoing design, an example in which space-frequency joint projection inverse transform is performed on the complex coefficient matrix corresponding to a second weighting coefficient matrix output by the second decoder is used for description.

Alternatively, the determined eigen-subspace matrix H' of the downlink channel satisfies the following formula:

$$H' = \sum_{j=1}^{J} C(f_{dec}(la, \text{latents}))|_j * U_{1,j} * U_{2,j}^*$$

H' represents the eigen-subspace matrix of the downlink channel. la represents the first information. latents represents the first scenario-related information, indicating a group of probabilities. The function $f_{dec}(\cdot)$ represents the second decoder, and the second decoder is configured to perform decoding based on the first information and the first scenario-related information. The function $C(\cdot)$ represents an output of the second decoder as a complex coefficient matrix. $C(\cdot)|_j$ represents a $j^{th}$ complex coefficient in the complex coefficient matrix, $j=1, \ldots, J$, the complex coefficient matrix includes J complex coefficients, $J \leq K \times L$, and K and L are positive integers. $U_{1,j}^*$ represents a column vector that is in a basis vector set in a spatial domain direction and that corresponds to $C(\cdot)|_j$, and the basis vector set in the spatial domain direction includes K column vectors. $U_{2,1}^*$ represents conjugate transpose on a column vector that is in a basis vector set in a frequency domain direction and that corresponds to $C(\cdot)|_j$, and the basis vector set in the frequency domain direction includes L column vectors. Optionally, the output of the second decoder may be a real coefficient matrix or a complex coefficient matrix. If the output of the second decoder is the real coefficient matrix, the foregoing function $C(\cdot)$ may transform the real coefficient matrix output by the second decoder into the complex coefficient matrix. Alternatively, if the output of the second decoder is directly the complex coefficient matrix, the function $C(\cdot)$ does not need to perform transformation.

In the foregoing design, an example in which space-frequency joint projection inverse transform is performed on the complex coefficient vector corresponding to the second weighting coefficient matrix output by the second decoder is used for description.

According to a second aspect, a communication method is provided. The method is performed by a terminal device, or may be performed by a component (a processor, a chip, a circuit, or another component) configured in a terminal device, or may be performed by a software module, or the like. The method includes: measuring a downlink reference signal received from a network device, to obtain third information of a downlink channel; determining first information and first scenario-related information of the downlink channel based on the third information; and sending the first information and the first scenario-related information to the network device.

In the foregoing design, in addition to feeding back the first information to the network device, the terminal device further feeds back, to the network device, the first scenario-related information corresponding to the current downlink channel. Subsequently, the network device may reconstruct related information of the downlink channel based on the first scenario-related information, to improve reconstruction precision.

In a first design, the first scenario-related information indicates identification information of a scenario corresponding to the downlink channel.

In the first design, the determining first information and first scenario-related information of the downlink channel based on the third information includes: determining the first scenario-related information based on the third information: determining a first encoder in at least one encoder based on the first scenario-related information; and obtaining the first information based on the third information and the first encoder. For example, the third information may be input into the first encoder, or the third information may be processed and then input into the first encoder. This is not limited. An output of the first encoder may be referred to as the first information, or information obtained by processing information output by the first encoder may be referred to as the first information. This is not limited.

In the first design, the determining the first scenario-related information based on the third information includes: determining the first scenario-related information based on an energy matrix P corresponding to the third information.

The foregoing manner of classifying scenarios by using the energy matrix P may be referred to as a hard decision manner. A scenario hard decision may be based on a coefficient energy ratio of a sparse angle-delay domain as a decision threshold, so that users in a networking scenario can be effectively classified, which is equivalent to adding an eigen. This facilitates convergence of a neural network, and improves reconstruction precision of the third information corresponding to the first information fed back based on the neural network.

In a second design, the first scenario-related information indicates N probability values, and each of the N probability values corresponds to one scenario. Optionally, a sum of the N probability values is less than or equal to 1.

According to a third aspect, an apparatus is provided. For beneficial effects, refer to records of the first aspect. The apparatus may be a network device, an apparatus configured in a network device, or an apparatus that can be matched with a network device for use. In a design, the apparatus may include a unit that is in one-to-one correspondence with the method/operation/step/action described in the first aspect. The unit may be implemented by using a hardware circuit, software, or a combination of a hardware circuit and software. For example, the apparatus may include a processing unit and a communication unit, and the processing unit and the communication unit may perform corresponding functions in any design example of the first aspect. The communication unit may be configured to receive first information and first scenario-related information of a downlink channel from a terminal device. The processing unit is configured to determine second information of the downlink channel based on the first scenario-related information and the first information. For an example execution processes of the processing unit and the communication unit, refer to the first aspect. Details are not described herein again.

According to a fourth aspect, an apparatus is provided. For beneficial effects, refer to records of the first aspect. The apparatus includes a processor, configured to implement the method described in the first aspect. The apparatus may further include a memory, configured to store instructions and/or data. The memory is coupled to the processor. When executing the program instructions stored in the memory: the processor may implement the method described in the first aspect. The apparatus may further include a communication interface. The communication interface is configured for communication between the apparatus and another device. For example, the communication interface may be a transceiver, a circuit, a bus, a module, a pin, or another type of communication interface. The another device may be a terminal device or the like. In a possible design, the apparatus includes:

the memory, configured to store the program instructions;
the communication interface, configured to receive first information and first scenario-related information of a downlink channel from a terminal device; and
the processor, configured to determine second information of the downlink channel based on the first scenario-related information and the first information.

For an example execution processes of the communication interface and the processor, refer to records of the first aspect. Details are not described again.

According to a fifth aspect, an apparatus is provided. For beneficial effects, refer to records of the second aspect. The apparatus may be a terminal device, an apparatus configured in a terminal device, or an apparatus that can be matched with a terminal device for use. In a design, the apparatus may include a unit that is in one-to-one correspondence with the method/operation/step/action described in the second aspect. The unit may be implemented by using a hardware circuit, software, or a combination of a hardware circuit and software. For example, the apparatus may include a processing unit and a communication unit, and the processing unit and the communication unit may perform corresponding functions in any design example of the second aspect. The processing unit may be configured to measure a downlink reference signal received from a network device, to obtain third information of a downlink channel. The processing unit is further configured to determine first information and first scenario-related information of the downlink channel based on the third information. The communication unit is configured to send the first information and the first scenario-related information to the network device. For an example execution processes of the processing unit and the communication unit, refer to the second aspect. Details are not described herein again.

According to a sixth aspect, an apparatus is provided. For beneficial effects, refer to records of the second aspect. The apparatus includes a memory, configured to implement the method described in the second aspect. The apparatus may further include a memory, configured to store instructions and/or data. The memory is coupled to the processor. When executing the program instructions stored in the memory, the processor may implement the method described in the second aspect. The apparatus may further include a communication interface. The communication interface is configured for communication between the apparatus and another device. For example, the communication interface may be a transceiver, a circuit, a bus, a module, a pin, or another type of communication interface. The another device may be a network device or the like. In a possible design, the apparatus includes:

the memory, configured to store the program instructions;
the processor, configured to: measure a downlink reference signal received from a network device, to obtain third information of a downlink channel; and determine first information and first scenario-related information of the downlink channel based on the third information; and
the communication interface, configured to send the first information and the first scenario-related information to the network device.

For an example execution processes of the communication interface and the processor, refer to records of the second aspect. Details are not described again.

According to a seventh aspect, an embodiment of this application further provides a computer-readable storage medium, including instructions. When the instructions are run on a computer, the computer is enabled to perform the method according to the first aspect or the second aspect.

According to an eighth aspect, an embodiment of this application provides a chip system. The chip system includes a processor, and may further include a memory. The chip system is configured to implement the method according to the first aspect or the second aspect. The chip system may include a chip, or may include a chip and another discrete device.

According to a ninth aspect, an embodiment of this application provides a computer program product, including instructions. When the instructions are run on a computer, the computer is enabled to perform the method according to the first aspect or the second aspect.

According to a tenth aspect, an embodiment of this application provides a system. The system includes the apparatus according to the third aspect or the fourth aspect and the apparatus according to the fifth aspect or the sixth aspect.

DESCRIPTION OF EMBODIMENTS

The following describes the technical solutions in embodiments of this application with reference to the accompanying drawings in embodiments of this application.

Figure 1:
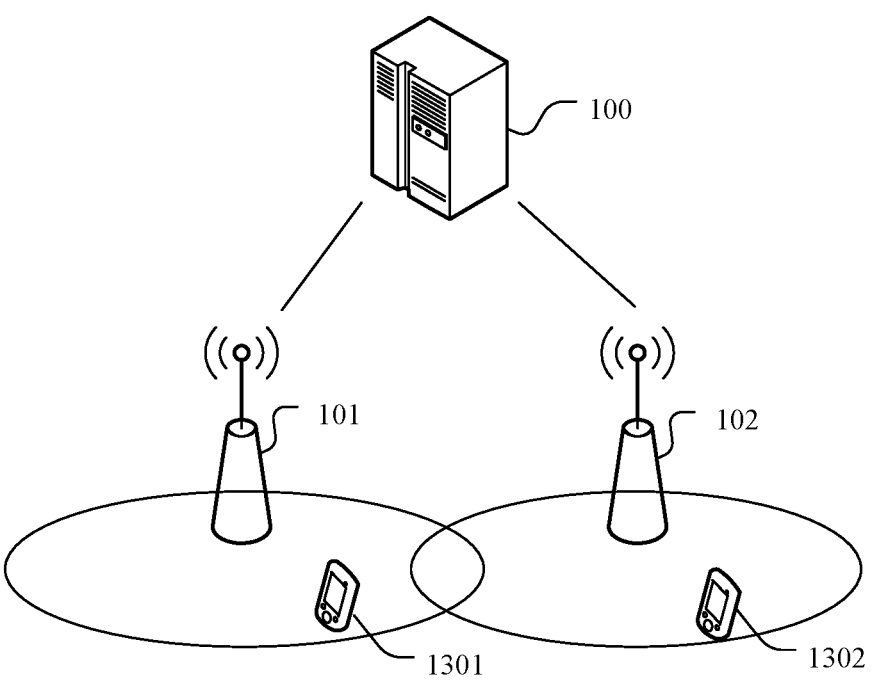
FIG. 1 is a schematic diagram of a network architecture according to an embodiment of this application.

FIG. 1 is a schematic diagram of a network architecture to which an embodiment of this application is applicable. As shown in FIG. 1, a terminal device (for example, a terminal device 1301 or a terminal device 1302) may access a wireless network, to obtain a service of an external network (for example, an internet) by using the wireless network, or communicate with another device by using the wireless network, for example, may communicate with another terminal device. The wireless network includes a radio access network (RAN) and a core network (CN). The RAN is configured to connect the terminal device to the wireless network. The CN is configured to manage the terminal device and provide a gateway for communicating with the external network.

The following separately describes in detail the terminal device, the RAN, and the CN in FIG. 1.

I. Terminal Device

The terminal device may be referred to as a terminal for short, and is a device having a wireless transceiver function. The terminal device may be mobile or fixed. The terminal device may be deployed on land, including an indoor or outdoor device, a handheld device, or a vehicle-mounted device: or may be deployed on water (for example, on a ship): or may be deployed in air (for example, on an aircraft, a balloon, or a satellite). The terminal device may be a mobile phone, a tablet computer (pad), a computer having a wireless transceiver function, a virtual reality (VR) terminal device, an augmented reality (AR) terminal device, a wireless terminal device in industrial control, a wireless terminal device in self driving, a wireless terminal device in telemedicine, a wireless terminal device in a smart grid, a wireless terminal device in transportation safety, a wireless terminal device in a smart city, and/or a wireless terminal device in a smart home. Alternatively, the terminal device may be a cellular phone, a cordless phone, a session initiation protocol (SIP) phone, a wireless local loop (WLL) station, a personal digital assistant (PDA), a handheld device or a computing device having a wireless communication function, a vehicle-mounted device, a wearable device, a terminal device in the $5^{th}$ generation (5G) network, a terminal device in a future evolved public land mobile network (PLMN), or the like. The terminal device sometimes may also be referred to as user equipment (UE). Optionally, the terminal device may communicate with a plurality of access network devices that use different technologies. For example, the terminal device may communicate with an access network device that supports long term evolution (LTE), or may communicate with an access network device that supports 5G, or may implement dual connectivity to an access network device that supports LTE and an access network device that supports 5G. This is not limited in embodiments of this application.

In embodiments of this application, an apparatus configured to implement a function of the terminal device may be a terminal device, or may be an apparatus that can support the terminal device in implementing the function, for example, a chip system, a hardware circuit, a software module, or a hardware circuit plus a software module. The apparatus may be installed in the terminal device or may be matched with the terminal device for use. In the technical solutions provided in embodiments of this application, the technical solutions provided in embodiments of this application are described by using an example in which the apparatus configured to implement the function of the terminal device is a terminal device and the terminal device is UE.

II. RAN

The RAN may include one or more RAN devices, for example, a RAN device 101 and a RAN device 102. An interface between the RAN device and the terminal device may be a Uu interface (or referred to as an air interface). In future communication, names of these interfaces may remain unchanged, or may be replaced with other names. This is not limited in this application.

The RAN device is a node or a device that enables the terminal device to access the wireless network. The RAN device may also be referred to as a network device or a base station. The RAN device includes but is not limited to: a base station, a next generation NodeB (gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmitting and receiving point (TRP), a transmitting point (TP), and/or a mobile switching center. Alternatively, the access network device may be at least one of a radio controller, a centralized unit (CU), a distributed unit (DU), a CU control plane (CU-CP) node, a CU user plane (CU-UP) node, or integrated access and backhaul (IAB) node in a cloud radio access network (CRAN) scenario. Alternatively, the access network device may be a relay station, an access point, a vehicle-mounted device, a terminal device, a wearable device, an access network device in the future 5G network, an access network device in a future evolved public land mobile network (PLMN), or the like.

In embodiments of this application, an apparatus configured to implement a function of the access network device may be an access network device, or may be an apparatus that can support the access network device in implementing the function, for example, a chip system, a hardware circuit, a software module, or a hardware circuit plus a software module. The apparatus may be installed in the access network device or may be matched with the access network device for use. In embodiments of this application, the chip system may include a chip, or may include a chip and another discrete device. In the technical solutions provided in embodiments of this application, the technical solutions provided in embodiments of this application are described by using an example in which the apparatus configured to implement the function of the access network device is an access network device and the access network device is a base station.

(1) Protocol Layer Structure

Communication between the RAN device and the terminal device complies with a specified protocol layer structure. The protocol layer structure may include a control plane protocol layer structure and a user plane protocol layer structure. For example, the control plane protocol layer structure may include functions of protocol layers such as a radio resource control (RRC) layer, a packet data convergence protocol (PDCP) layer, a radio link control (RLC) layer, a media access control (MAC) layer, and a physical layer. For example, the user plane protocol layer structure may include functions of protocol layers such as a PDCP layer, an RLC layer, a MAC layer, and a physical layer. In a possible implementation, a service data adaptation proto-col (SDAP) layer may be further included above the PDCP layer.

Figure 2A:
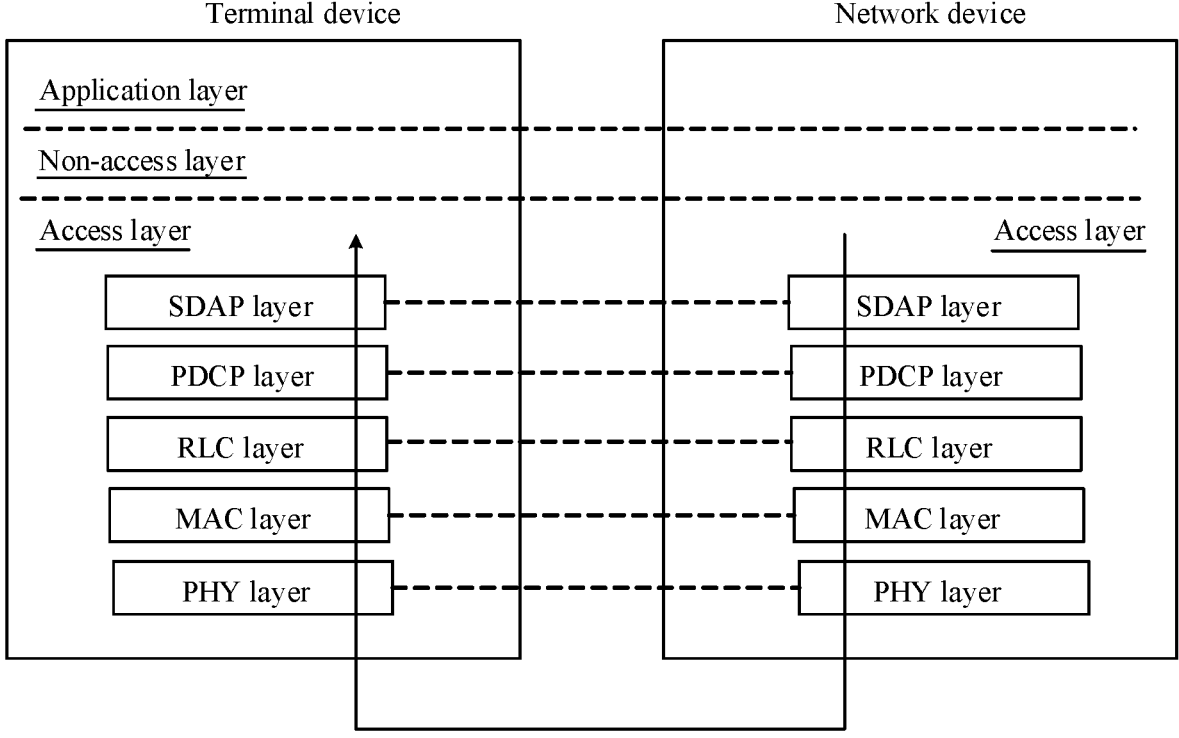
FIG. 2a, FIG. 2b, FIG. 2c, and FIG. 2d are schematic diagrams of protocol stacks according to an embodiment of this application.

Data transmission between a network device and a ter-minal device is used as an example. Data transmission needs to pass through a user plane protocol layer, for example, through the SDAP layer, the PDCP layer, the RLC layer, the MAC layer, and the physical layer. The SDAP layer, the PDCP layer, the RLC layer, the MAC layer, and the physical layer may be collectively referred to as an access layer. Because a data transmission direction is a sending direction or a receiving direction, each layer is further divided into a sending part and a receiving part. Downlink data transmis-sion is used as an example. FIG. 2a is a schematic diagram of transmitting downlink data between layers. In FIG. 2a, a downward arrow represents data sending, and an upward arrow represents data receiving. After obtaining data from an upper layer, the PDCP layer transmits the data to the RLC layer and the MAC layer, the MAC layer generates a transport block, and then wireless transmission is performed through the physical layer. The data is correspondingly encapsulated at each layer. For example, data received by a layer from an upper layer of the layer is considered as a service data unit (SDU) of the layer, becomes a protocol data unit (PDU) after being encapsulated at the layer, and then is transmitted to a next layer.

For example, it may be further learned from FIG. 2a that the terminal device may further have an application layer and a non-access layer. The application layer may be con-figured to provide a service for an application installed in the terminal device. For example, downlink data received by the terminal device may be sequentially transmitted from the physical layer to the application layer, and then provided by the application layer for the application. For another example, the application layer may obtain data generated by the application, sequentially transmit the data to the physical layer, and send the data to another communication appara-tus. The non-access layer may be configured to forward user data. For example, the non-access layer forwards uplink data received from the application layer to the SDAP layer, or forwards downlink data received from the SDAP layer to the application layer.

(2) CU and DU

Figure 2B:
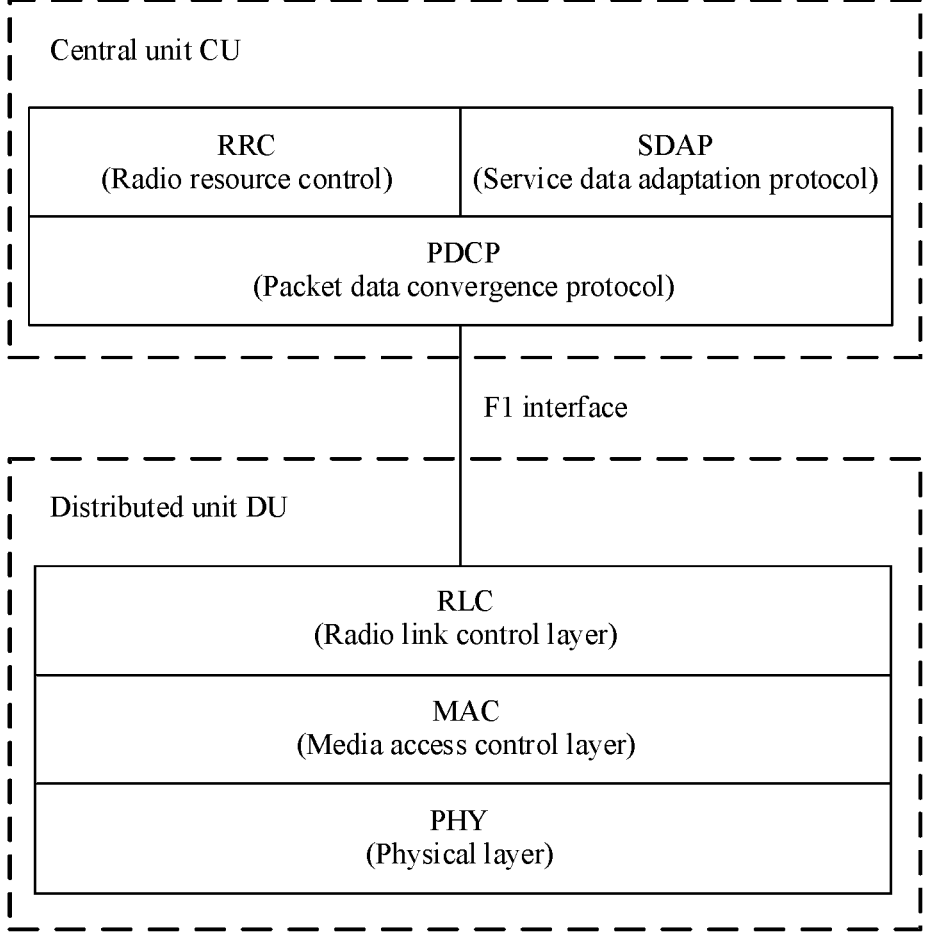
Figure 2C:
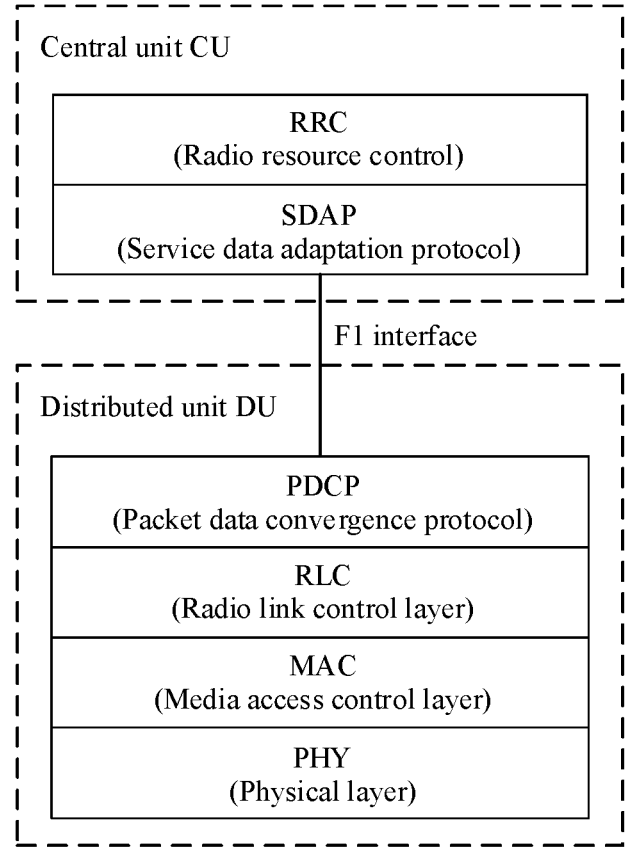

In embodiments of this application, the RAN device may include the CU and the DU. A plurality of DUs may be centrally controlled by one CU. For example, an interface between the CU and the DU may be referred to as an F1 interface. A control plane (CP) interface may be F1-C, and a user plane (UP) interface may be F1-U. The CU and the DU may be divided based on protocol layers of a wireless network. For example, as shown in FIG. 2b, functions of the PDCP layer and protocol layers above the PDCP layer are set on the CU, and functions of protocol layers below the PDCP layer (for example, the RLC layer and the MAC layer) are set on the DU. For another example, as shown in FIG. 2c, functions of protocol layers above the PDCP layer are set on the CU, and functions of the PDCP layer and protocol layers below the PDCP layer are set on the DU.

It may be understood that division of processing functions of the CU and the DU based on the protocol layers is merely an example, and there may be another division manner. For example, the CU or the DU may be divided into functions having more protocol layers. For another example, the CU or the DU may be further divided into some processing functions having protocol layers. In a design, some functions of the RLC layer and functions of protocol layers above the RLC layer are set on the CU, and remaining functions of the RLC layer and functions of protocol layers below the RLC layer are set on the DU. In another design, functions of the CU or the DU may alternatively be divided based on service types or other system requirements. For example, division may be performed based on a delay. Functions whose processing time needs to satisfy a delay requirement are set on the DU, and functions whose processing time does not need to satisfy the delay requirement are set on the CU. In another design, the CU may alternatively have one or more functions of the core network. For example, the CU may be disposed on a side of the network to facilitate centralized management. In another design, a radio unit (RU) of the DU is disposed remotely. The RU has a radio frequency func-tion.

Optionally, the DU and the RU may be further divided at the physical layer (PHY). For example, the DU may imple-ment high-layer functions of the PHY layer, and the RU may implement low-layer functions of the PHY layer. When the physical layer is configured to perform sending, functions of the physical layer may include functions of cyclic redun-dancy check (CRC) code addition, channel encoding, rate matching, scrambling, modulation, layer mapping, precod-ing, resource mapping, physical antenna mapping, and/or radio frequency sending. When the PHY layer is configured to perform receiving, functions of the PHY layer may include functions of CRC, channel decoding, de-rate match-ing, descrambling, demodulation, layer de-mapping, chan-nel detection, resource de-mapping, physical antenna de-mapping, and/or radio frequency receiving. The high-layer functions of the PHY layer may include one part of functions of the PHY layer. For example, the part of functions is closer to the MAC layer. The low-layer functions of the PHY layer may include the other part of functions of the PHY layer. For example, the other part of functions is closer to the radio frequency function. For example, the high-layer functions of the PHY layer may include functions of CRC code addition, channel encoding, rate matching, scrambling, modulation, and layer mapping, and the low-layer functions of the PHY layer may include functions of precoding, resource mapping, physical antenna mapping, and radio frequency sending. Alternatively: the high-layer functions of the PHY layer may include functions of CRC code addition, channel encoding, rate matching, scrambling, modulation, layer mapping, and precoding, and the low-layer functions of the PHY layer may include functions of resource mapping, physical antenna mapping, and radio frequency sending.

Figure 2D:
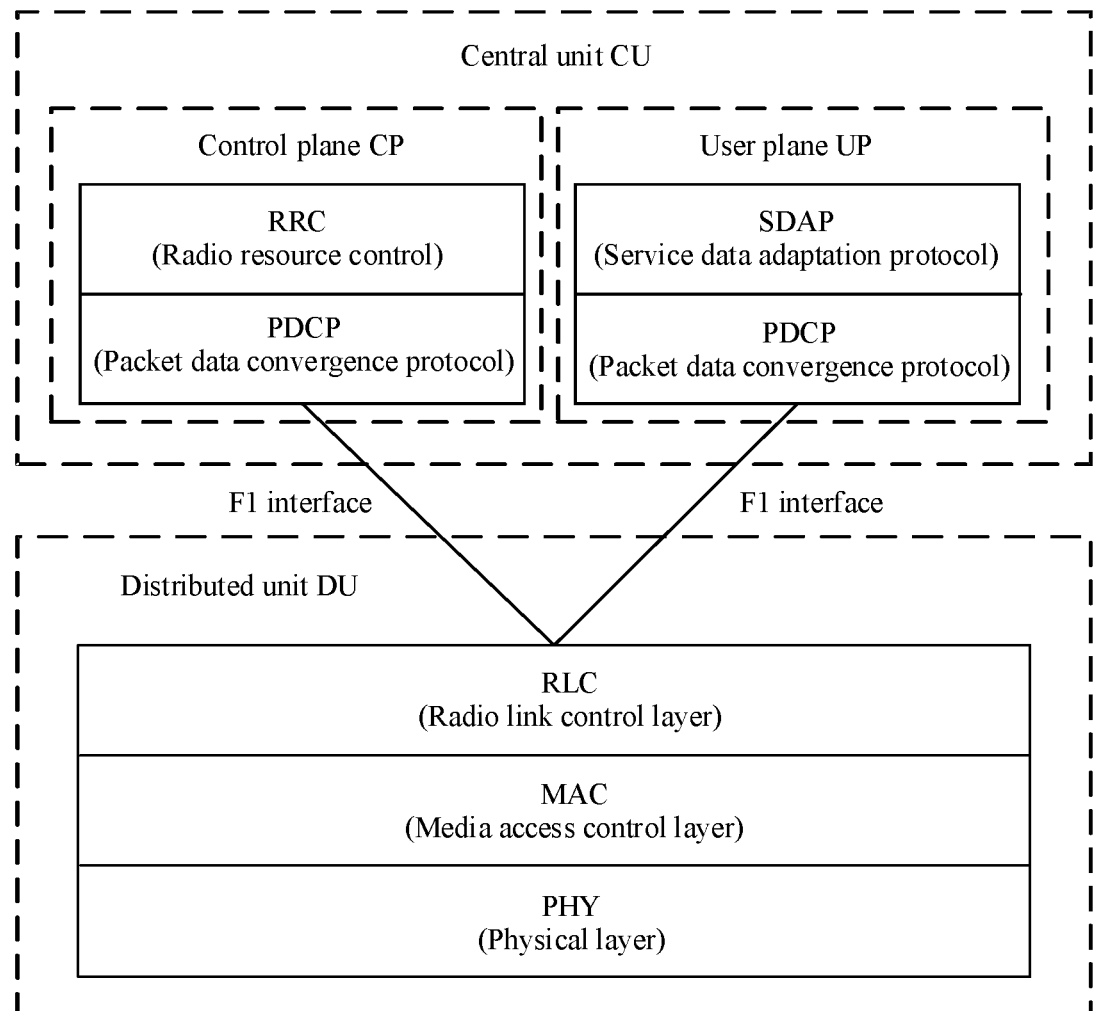

For example, the functions of the CU may be imple-mented by one entity, or may be implemented by different entities. For example, as shown in FIG. 2d, the functions of the CU may be further divided, that is, a control plane and a user plane are separated and implemented by using dif-ferent entities, which are respectively a control plane CU entity (namely, a CU-CP entity) and a user plane CU entity (namely: a CU-UP entity). The CU-CP entity and the CU-UP entity may be coupled to the DU, to jointly complete the function of the RAN device.

It should be noted that in the architectures shown in FIG. 2b to FIG. 2d, signaling generated by the CU may be sent to the terminal device by using the DU, or signaling generated by the terminal device may be sent to the CU by using the DU. For example, signaling at the RRC or PDCP layer is finally processed as signaling at the physical layer and is sent to the terminal device, or is converted from signaling received from the physical layer. In the architectures, sig-naling at the RRC or PDCP layer may be considered to be sent by using the DU, or sent by using the DU and the RU.

Optionally, any one of the DU, the CU, the CU-CP, the CU-UP, and the RU may be a software module, a hardware structure, or a software module plus a hardware structure. This is not limited. Different entities may exist in different forms. This is not limited. For example, the DU, the CU, the CU-CP, and the CU-UP are software modules, and the RU is a hardware structure. These modules and methods performed by the modules also fall within the protection scope of embodiments of this application.

III. CN

The CN may include one or more CN devices, for example, a CN device 100. The 5G communication system is used as an example. The CN may include an access and mobility management function (AMF) network element, a session management function (SMF) network element, a user plane function (UPF) network element, a policy control function (PCF) network element, a unified data management (UDM) network element, an application function (AF) network element, and the like.

In embodiments of this application, an apparatus configured to implement a function of the core network device may be a core network device, or may be an apparatus that can support the core network device in implementing the function, for example, a chip system, a hardware circuit, a software module, or a hardware circuit plus a software module. The apparatus may be installed in the core network device or may be matched with the core network device for use. In the technical solutions provided in embodiments of this application, the technical solutions provided in embodiments of this application are described by using an example in which the apparatus configured to implement the function of the core network device is a core network device.

It should be understood that quantities of devices in the communication system shown in FIG. 1 are merely used as an example. Embodiments of this application are not limited thereto. During actual application, the communication system may further include more terminal devices and more RAN devices, and may further include another device.

The network architecture shown in FIG. 1 may be applicable to communication systems of various radio access technologies (RATs), for example, may be a 4G (or referred to as LTE) communication system, may be a 5G (or referred to as new radio (NR)) communication system, or may be a transition system between an LTE communication system and a 5G communication system. The transition system may also be referred to as a 4.5G communication system, or certainly may be a future communication system, for example, a 6G communication system. The network architecture and service scenarios described in embodiments of this application are intended to describe the technical solutions in embodiments of this application more clearly, and do not constitute a limitation on the technical solutions provided in embodiments of this application. A person of ordinary skill in the art may know that, with evolution of the communication network architecture and emergence of new service scenarios, the technical solutions provided in embodiments of this application are also applicable to similar technical problems.

It may be understood that in embodiments of this application, the base station or the UE may perform some or all of the steps in embodiments of this application. These steps or operations are merely examples. In embodiments of this application, other operations or variations of various operations may be further performed. In addition, the steps may be performed in a sequence different from that presented in embodiments of this application, and not all the operations in embodiments of this application may need to be performed.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

Figure 3:
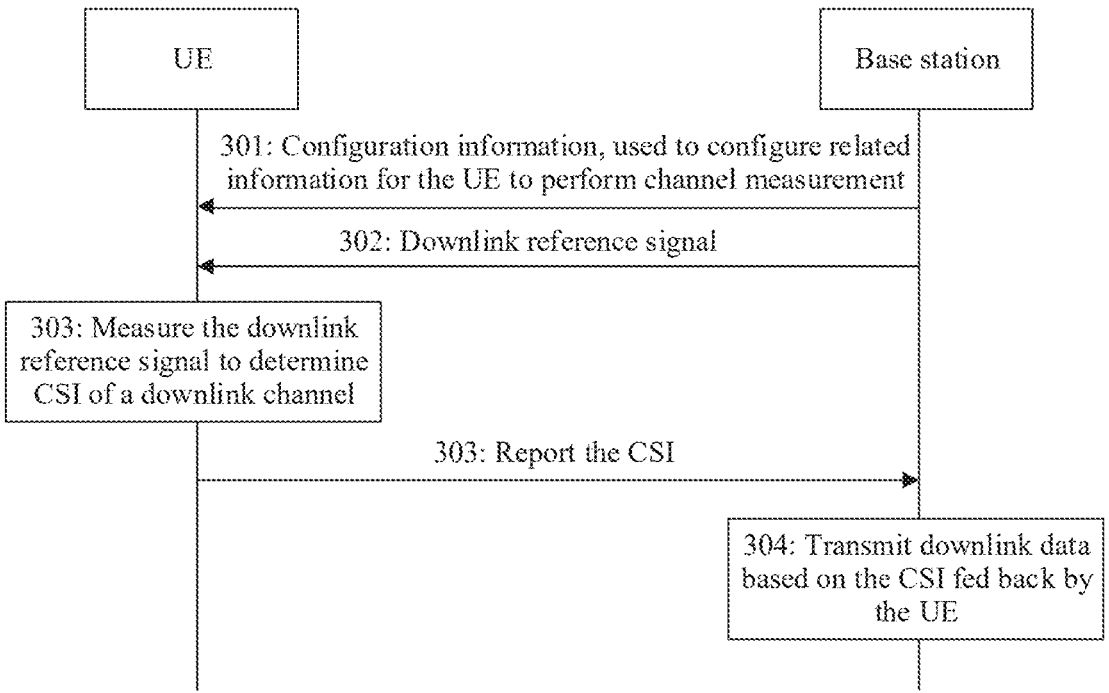
FIG. 3 is a flowchart of reporting channel state information (CSI) according to an embodiment of this application.

In a possible implementation, a channel state information (CSI) feedback mechanism may use a procedure shown in FIG. 3, where the procedure includes at least the following steps.

Step 301: a base station sends configuration information to UE, where the configuration information is used to configure related information for the UE to perform channel measurement. For example, the configuration information is used to configure at least one of the following: time information for the UE to perform channel measurement, a type of a reference signal (RS) for the UE to perform channel measurement, a time domain resource and/or a frequency domain resource occupied by the reference signal, a report condition of a measurement quantity of the UE, or the like.

Step 302: the base station sends a downlink reference signal to the UE.

The downlink reference signal is used by the UE to perform channel measurement, and the downlink reference signal may also be referred to as a downlink pilot.

Step 303: the UE measures the received downlink reference signal, determines CSI of a downlink channel, and reports or feeds back the CSI of the measured downlink channel to the base station.

Step 304: the base station transmits downlink data based on the CSI fed back by the UE.

For example, the CSI fed back by the UE to the base station includes one or more of the following: a rank indicator (RI), a channel quality indicator (CQI), and a precoding matrix indicator (PMI). The base station may determine, based on the RI fed back by the UE, a quantity of streams of the downlink data transmitted to the UE. The base station may determine, based on the CQI fed back by the UE, a modulation order of the downlink data transmitted to the UE, a bit rate of channel encoding, and the like. The base station may determine, based on the PMI fed back by the UE, a precoding vector used during precoding of the downlink data transmitted to the UE.

Figure 4:
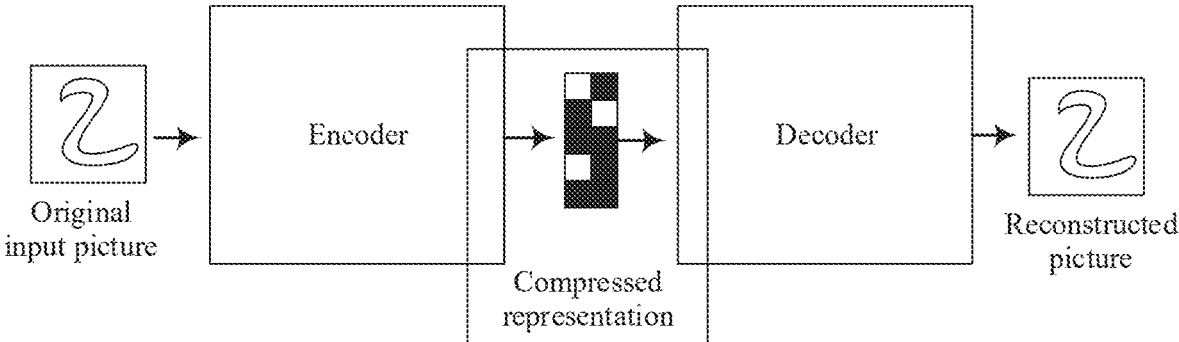
FIG. 4 is a schematic diagram of an encoder and a decoder according to an embodiment of this application.

Because an encoder in an auto-encoder may compress information into a low-dimensional representation, and a decoder in the auto-encoder may further obtain original information with proportionate precision through reconstruction, the auto-encoder well matches a transmission scenario that is limited by air interface overheads such as CSI feedback. The auto-encoder is an unsupervised learning neural network, is characterized by using input data as label data, and therefore is referred to as self-supervised learning. As shown in FIG. 4, the auto-encoder includes two parts: the encoder and the decoder. Picture encoding is used as an example. At a transmitter, an original picture 2 is input into the encoder, to obtain an output result. The output result is generally a low-dimensional representation of the original input, and the low-dimensional representation may also be referred to as a compressed representation. At a receiver, data is restored by using the corresponding decoder, and a picture 2 is obtained through reconstruction. It should be noted that a smaller error between the picture 2 obtained through reconstruction or output by the decoder and the original picture 2 is preferred. An auto-encoder technology is often used for data compression (at the transmitter) and restoration (at the receiver). Optionally, the encoder and the decoder may each include various deep neural networks, for example, a multi-layer perceptron (MLP), a convolutional neural network (CNN), and a recurrent neural network (RNN), to implement different training purposes. The encoder and the decoder may be used in pairs after being trained in a matching manner.

Figure 5:
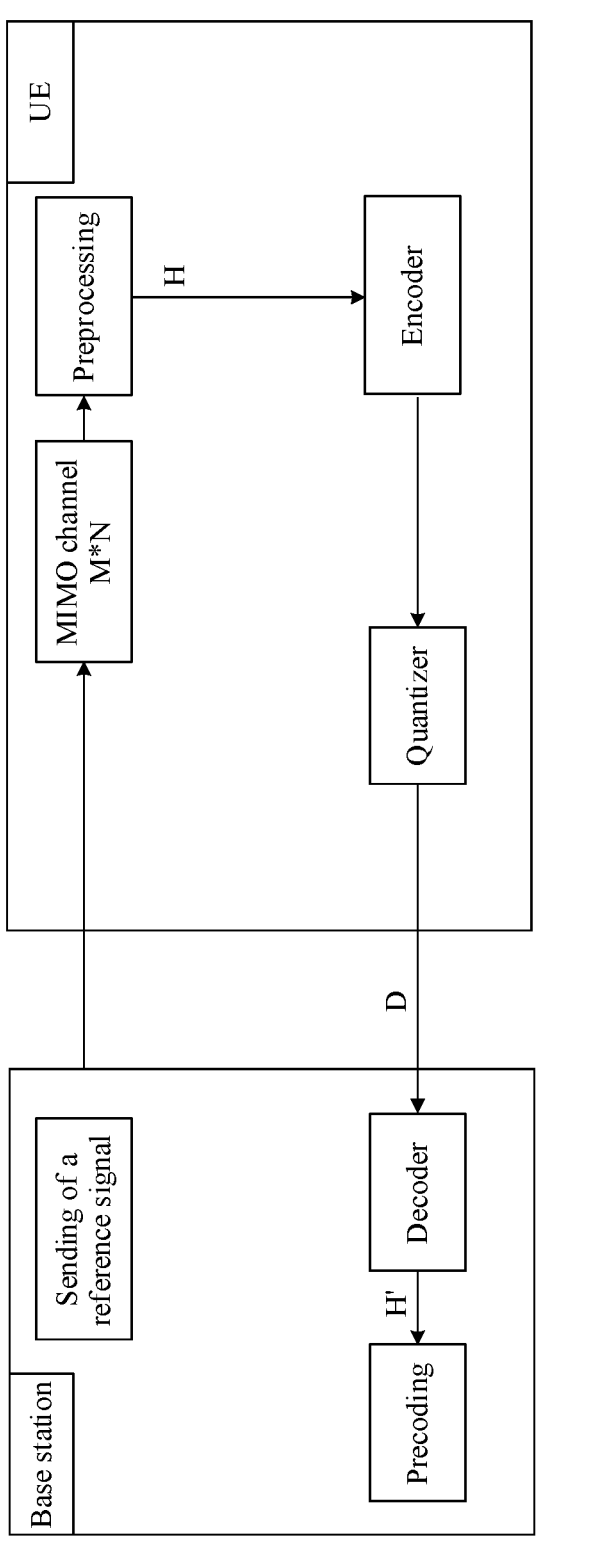
FIG. 5 is a schematic diagram of a structure of feeding back CSI according to an embodiment of this application.

FIG. 5 is a schematic diagram of a CSI feedback framework based on an AI architecture. Feeding back CSI of a downlink channel is used as an example. An encoder is deployed on a side of UE, and the UE may measure a reference signal from a base station, to obtain a downlink MIMO channel. The downlink MIMO channel may be represented by using an M*N-dimensional matrix. An eigen-subspace matrix H of the downlink channel may be obtained by using a preprocessing module. A preprocessing result is input into the encoder, and a low-dimensional code word D is obtained through compression. After being quantized, the low-dimensional code word D is fed back to the base station through an air interface. The base station inputs the received code word into a decoder, and obtains an eigen-subspace matrix H' of the downlink channel through reconstruction. Generally, H and H' have a same matrix dimension.

Figure 6:
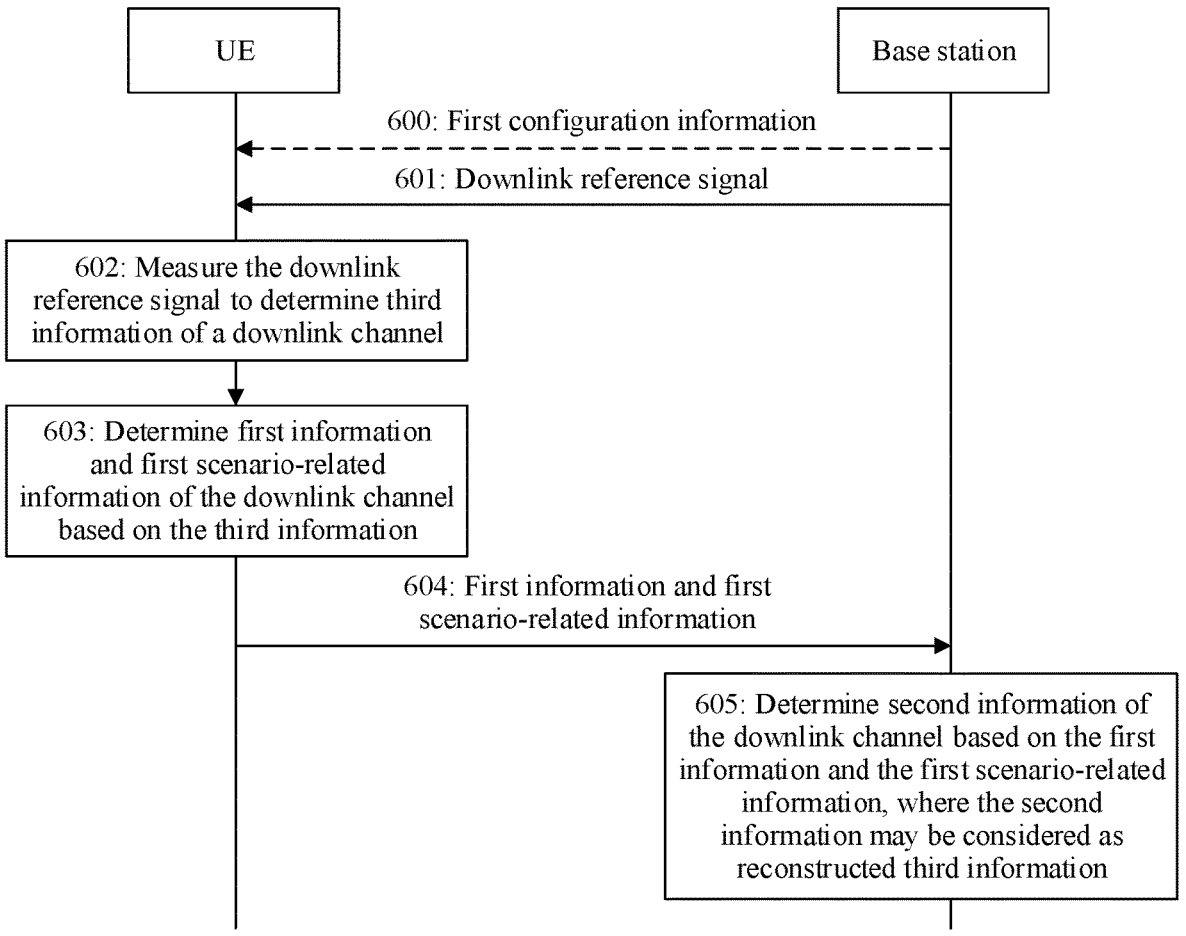
FIG. 6 is a flowchart of a communication method according to an embodiment of this application.

Based on simulation verification and analyzing, in a CSI feedback method shown in FIG. 5, neural networks in the encoder and the decoder are generalized, but reconstruction precision is usually limited. During actual application, there are various downlink channel environments between the UE and the base station, and large-scale information is rich. The large-scale information means different channel attenuation caused by refraction, reflection, scattering, or the like on a transmission path of a wireless channel due to a change in a physical environment, or different penetration losses caused by obstacles on a propagation path. In the CSI feedback method shown in FIG. 5, regardless of an environment corresponding to the downlink channel, a same set of an encoder and a decoder is used, and related information of the current downlink channel is not considered during encoding and/or decoding. As a result, precision of the eigen-subspace matrix H' of the downlink channel obtained by the base station through reconstruction is low:

Embodiments of this application provide a communication method. Scenario-related information is introduced to the communication method. The scenario-related information may indicate an environment of a downlink channel. A decoder may obtain an eigen-subspace matrix H' of the downlink channel through reconstruction with reference to the scenario-related information, to improve reconstruction precision of the eigen-subspace matrix H' of the downlink channel. As shown in FIG. 6, an embodiment of this application provides a procedure of a communication method, where the procedure includes at least the following steps.

Optionally, step 600: UE receives first configuration information from a base station, where the first configuration information may include a resource setting of UE measurement, a report setting of first information, and the like. For example, the resource setting of UE measurement may notify the UE to measure which reference signals, to obtain the first information. The report setting of the first information may notify the UE how to report the first information, and the like.

Optionally, the first configuration information may further include scenario-related configuration information. The scenario-related configuration information notifies the UE whether a current feedback mechanism of the first information is based on a scenario-related manner, and notifies the UE of a form in which the UE reports scenario-related information, and the like. For example, the scenario-related configuration information may implement at least one of the following functions.

1. Function of indicating, to the UE, whether the current feedback mechanism of the first information is based on the scenario-related manner. For example, the scenario-related configuration information may include a scenario-related switch. If the scenario-related switch is enabled, the UE is notified to feed back the first information based on the scenario-related information. Alternatively, if the scenario-related switch is disabled, the UE is notified that the first information does not need to be fed back based on the scenario-related information.

2. Function of indicating a format in which the UE reports the scenario-related information. For example, the UE is notified of a bit occupied for reporting the scenario-related information, and/or the UE is notified of candidate scenarios, and the UE can select appropriate scenario information for reporting within this range.

3. Function of indicating a manner in which the UE reports the scenario-related information. For example, the UE may be notified to periodically report the scenario-related information, for example, report the scenario-related information every transmission time interval (TTI), every M milliseconds, or the like. Alternatively, the UE may be notified to trigger reporting based on signaling. Reporting triggered based on the signaling may include aperiodic reporting, semi-persistent reporting, or the like. A process of aperiodic reporting may include: the UE reporting the scenario-related information to the base station one or more times when receiving a report instruction from the base station. A difference between semi-persistent reporting and periodic reporting is that, although a periodicity may be further predefined during semi-persistent reporting, the base station needs to send activation signaling before the UE reports the scenario-related information based on the predefined periodicity. In other words, the UE periodically reports the scenario-related information based on the predefined periodicity when receiving the activation signaling, and stops periodically reporting the scenario-related information when receiving deactivation signaling.

Step 601: the UE receives a downlink reference signal from the base station, where the downlink reference signal is used for downlink channel measurement.

Optionally: the UE may receive the downlink reference signal based on the resource setting of UE measurement in the first configuration information. For example, a type and/or a time-frequency domain resource of a downlink reference signal that needs to be measured by the UE may be configured in the first configuration information.

Step 602: the UE measures the downlink reference signal, to obtain third information of a downlink channel.

In a design, the UE may measure the downlink reference signal, to obtain a downlink MIMO channel. The downlink MIMO channel may be represented as a three-dimensional matrix. Optionally, the UE may preprocess the three-dimensional matrix, to obtain a sparse representation of the downlink channel. For example, the UE may process the three-dimensional matrix, to obtain an eigen-subspace matrix H of the downlink channel, and perform space-frequency joint projection on the eigen-subspace matrix H of the downlink channel, to obtain the sparse representation of the downlink channel. In this design, the third information may be considered as the eigen-subspace matrix H of the downlink channel.

Step 603: the UE determines first information and first scenario-related information of the downlink channel based on the third information.

In a design, the first scenario-related information indicates identification information of a scenario corresponding to the downlink channel. Refer to the following Embodiment 1. The UE may determine the first scenario-related information based on the third information. For example, the UE may determine the first scenario-related information based on an energy matrix P corresponding to the third information. For example, the UE may transform the third information, namely, the eigen-subspace matrix H of the downlink channel, into the sparse representation of the downlink channel. The sparse representation of the downlink channel is a complex coefficient matrix, and the energy matrix P corresponding to the complex coefficient matrix may be obtained. The first scenario-related information is obtained based on the energy matrix P. For an example process, refer to step 806 in the following Embodiment 1. The UE determines a first encoder in at least one encoder based on the first scenario-related information. The first encoder may be considered as an encoder corresponding to the scenario indicated by the first scenario-related information. The UE obtains the first information based on the third information and the first encoder. It can be learned from the foregoing descriptions that the third information is the sparse representation of the downlink channel corresponding to the eigen-subspace matrix H of the downlink channel, and the representation is a complex coefficient matrix. The UE may input the complex coefficient matrix into the first encoder, or may transform the complex coefficient matrix into a real coefficient matrix. Refer to step 808 in Embodiment 1. The real coefficient matrix is input into the first encoder. It should be noted that an input of an encoder is related to a format of the encoder. Some encoders support an input of the complex coefficient matrix, some encoders support an input of the real coefficient matrix, or some encoders support an input of another format. This is not limited. In subsequent descriptions of some embodiments of this application, an example in which the encoder supports the input of the real coefficient matrix is used for description. An output of the first encoder may be used as the first information. Alternatively, information obtained by processing an output of the first encoder is referred to as the first information. For example, the output of the first encoder may be a real number vector la, and la is quantized and may be transformed into a bit stream. The bit stream may be used as the first information. Alternatively, the bit stream may be fed back to the base station as an information element (IE) of CSI, and the first information may be the CSI or the like. Similarly, in some embodiments of this application, an output of an encoder is related to a format supported by the encoder. In subsequent descriptions, an example in which the output of the encoder is the real number vector la is used for description, but does not limit this application.

In another design, the first scenario-related information indicates N probability values, and each of the N probability values corresponds to one scenario. The UE may determine the first scenario-related information based on the third information. For example, the UE may transform the third information, namely, the sparse representation of the downlink channel corresponding to the eigen-subspace matrix H of the downlink channel, into a complex coefficient matrix, and input the complex coefficient matrix into a neural network. An output of the neural network is the first scenario-related information. It may be understood that the neural network identifies a scenario of the downlink channel. Alternatively, the UE may process the eigen-subspace matrix H of the downlink channel, the sparse representation of the downlink channel, or the like by using a preset algorithm, to obtain the first scenario-related information. Alternatively, the UE may determine the first scenario-related information with reference to a neural network and a preset algorithm. This is not limited. Further, the UE may determine the first information based on the third information. For example, the UE may transform the third information, namely, the sparse representation of the downlink channel corresponding to the eigen-subspace matrix H of the downlink channel, into a real coefficient matrix, and input the real coefficient matrix into a second encoder. The second encoder is pre-deployed in the UE, and an output of the second encoder may be referred to as the first information. Alternatively, information obtained by processing information output by the second encoder is referred to as the first information. For details, refer to the foregoing design descriptions.

Step 604: the UE sends the first information and the first scenario-related information to the base station.

Optionally, the UE may report the first information to the base station based on the report setting of the first information in step 600, and report first scenario-related information to the base station based on the scenario-related configuration information in step 600.

Step 605: the base station determines second information of the downlink channel based on the first scenario-related information and the first information, where the second information may be considered as reconstructed third information. An example in which the third information is the eigen-subspace matrix H of the downlink channel is used. The second information may be a reconstructed eigen-subspace matrix H' of the downlink channel.

In correspondence to the first design, if the first scenario-related information indicates the identification information of the scenario corresponding to the downlink channel, the base station may determine a first decoder in at least one decoder based on the first scenario-related information. The first decoder may be a decoder corresponding to the scenario indicated by the first scenario-related information. The UE obtains the second information of the downlink channel based on the first information and the first decoder. For example, the UE may obtain a first weighting coefficient matrix based on the first information and the first decoder. The first weighting coefficient matrix is a real coefficient matrix or a complex coefficient matrix. An example in which the first information is the output la of the first encoder is used. The UE may input la into the first decoder, and an output of the first decoder may be the first weighting coefficient matrix. The UE performs space-frequency joint projection inverse transform on the complex coefficient matrix or a complex coefficient vector corresponding to the first weighting coefficient matrix, to determine the second information. Refer to step 809 in the following Embodiment 1. It should be noted that, in embodiments of this application, an input, an output, and the like of a decoder are not limited, and the input and the output of the decoder are related to a format supported by the decoder. In the descriptions of this application, an example in which the input of the decoder is the real number vector la and the output of the decoder is the real coefficient matrix, namely, a weighting coefficient matrix is used for description, but does not limit this application.

In correspondence to the second design, if the first scenario-related information indicates the N probability values, and each probability value corresponds to one scenario, the base station may obtain a second weighting coefficient matrix based on the first scenario-related information, the first information, and a second decoder. The second weighting coefficient matrix is a real coefficient matrix or a complex coefficient matrix. If the first information is the output la of the first encoder, the base station may input la into the second decoder, and an output of the second decoder is the second weighting coefficient matrix. The base station performs space-frequency joint projection inverse transform on the complex coefficient matrix or a complex coefficient vector corresponding to the second weighting coefficient matrix, to determine the eigen-subspace matrix H' of the downlink channel. Refer to step 1009 in the following Embodiment 2.

It should be noted that the foregoing explanations and descriptions of the information are merely examples, and are not intended to limit embodiments of this application. For example, in an implementation, the UE estimates the downlink reference signal, to obtain a matrix corresponding to downlink MIMO channel. The UE may send indication information of the matrix to the base station. When receiving the indication information of the matrix, the base station preprocesses the matrix, to obtain the eigen-subspace matrix of the downlink channel. In this implementation, the first information sent by the UE to the base station may be the indication information of the matrix corresponding to the downlink MIMO channel. The second information obtained by the base station through reconstruction may be considered as the matrix corresponding to the downlink MIMO channel. The third information may be considered as a MIMO matrix of the downlink channel. Then, the base station may perform singular value decomposition (SVD) on the matrix corresponding to the downlink MIMO channel, to obtain the eigen-subspace matrix H' of the downlink channel. Subsequently, the base station may precode transmitted downlink data based on the eigen-subspace matrix H' of the downlink channel.

Embodiment 1

Figure 7:
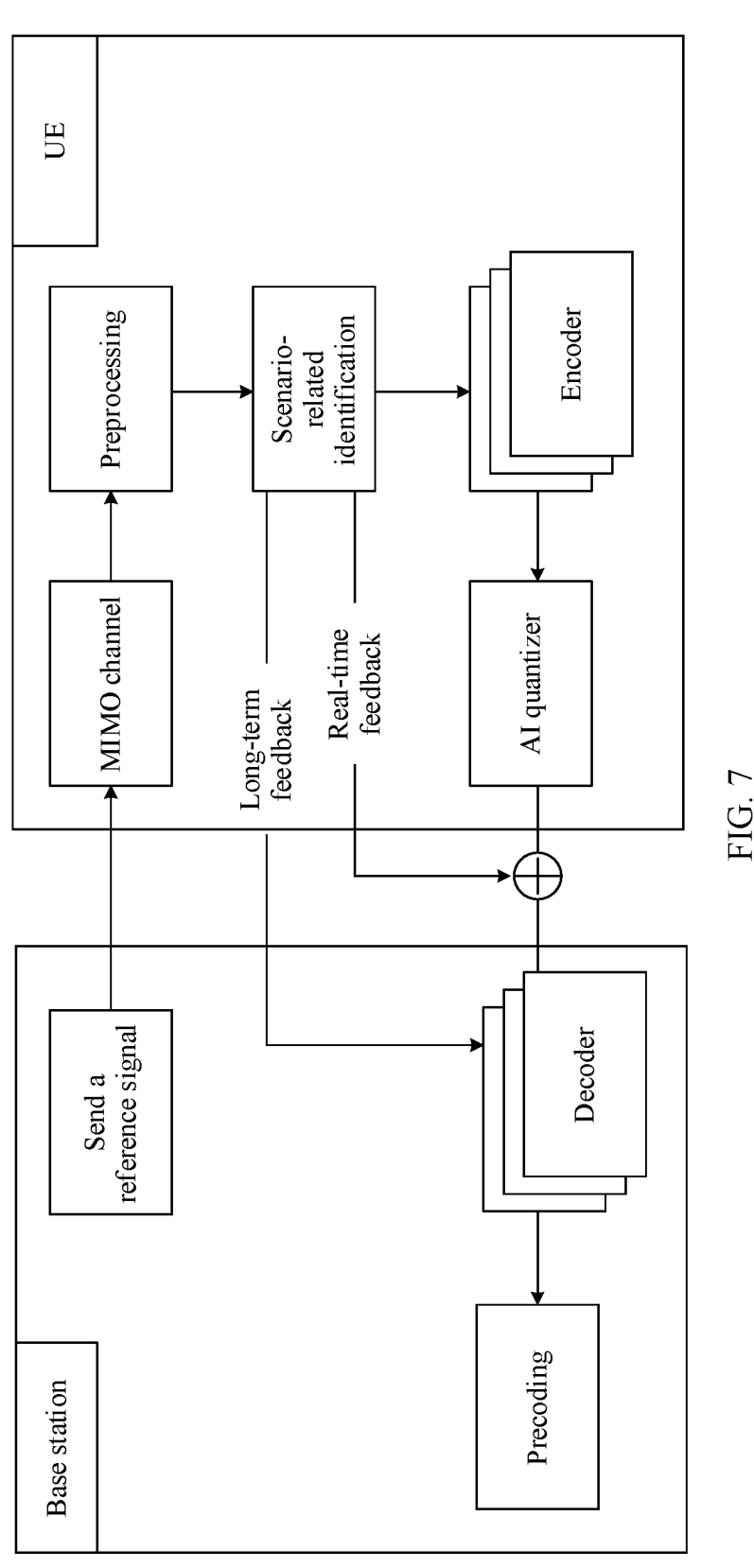
FIG. 7 is a schematic diagram of a structure of feeding back CSI according to Embodiment 1 of this application.

FIG. 7 is a schematic diagram of a framework of a CSI feedback mechanism. UE may receive a downlink reference signal from a base station, and measure the downlink reference signal. The UE may obtain a downlink MIMO channel, and preprocess a matrix of the downlink MIMO channel, to obtain an eigen-subspace matrix H of the downlink channel. The UE performs scenario identification on the current downlink channel based on a preprocessing result, and determines a scenario (which may be referred to as a target scenario) corresponding to or matching the current downlink channel. This process may correspond to a scenario-related identification process in FIG. 7. For example, N scenarios are predefined. The UE may select, from the N scenarios, the scenario, namely, the target scenario, matching the current downlink channel. The UE may send identification information of the target scenario to the base station. The identification information of the target scenario may be referred to as first scenario-related information, in other words, the first scenario-related information may represent the identification information of the scenario corresponding to the current downlink channel. For example, four scenarios are classified in advance, and indexes are sequentially 1 to 4. If the scenario corresponding to the current downlink channel is a scenario 1, the first scenario-related information may represent identification information of the scenario 1, for example. "00". Similarly, if the scenario corresponding to the current downlink channel is a scenario 2, a scenario 3, or a scenario 4, the first scenario-related information may separately indicate identification information of the scenario 2, the scenario 3, or the scenario 4. For example, the identification information may be "0) 1". "10", or "11". The first scenario-related information may be independently fed back to the base station, or may be fed back to the base station together with CSI. For example, the first scenario-related information may be fed back to the base station as an IE of the CSI. Because the UE reports the CSI to the base station in real time, if the first scenario-related information is fed back to the base station together with the CSI, it may be referred to as feeding back the first scenario-related information in real time. In addition to performing a real-time feedback, the UE may perform a long-term feedback on the first scenario-related information. For example, the UE feeds back the first scenario-related information in a long periodicity, or the UE feeds back the first scenario-related information to the base station when receiving a trigger command from the base station, or the UE feeds back the first scenario-related information to the base station when the first scenario-related information changes.

In Embodiment 1, at least one encoder is deployed in the UE, and each encoder corresponds to a different scenario. The UE may determine a first encoder in the at least one encoder based on the first scenario-related information. The first encoder is an encoder corresponding to the scenario corresponding to the current downlink channel. For example, four scenarios are classified in advance, the at least one encoder deployed in the UE includes four encoders, indexes are sequentially A to D, and each encoder corresponds to a different scenario. If the scenario corresponding to the current downlink channel is a scenario A, the first encoder selected by the UE is an encoder A. Similarly, if the scenario corresponding to the current downlink channel is a scenario B, a scenario C, a scenario D, or the like, the first encoder selected by the UE may be an encoder B, an encoder C, an encoder D, or the like. The UE may input the preprocessing result into the first encoder, to obtain a real number vector la. A bit stream formed after the real number vector la is quantized by an artificial intelligence (AI) quantizer may be referred to as first information. The first information may form the CSI together with a PMI, a CQI, an RI, and the like, and the CSI is fed back to the base station through an air interface. Correspondingly, at least one decoder may be pre-deployed in the base station, and each decoder corresponds to a different scenario. The decoder deployed in the base station and the encoder deployed in the UE are in pairs. After the base station receives the CSI and the first scenario-related information, the base station may determine a first decoder in the at least one decoder based on the first scenario-related information. The first decoder may be a decoder corresponding to the scenario indicated by the first scenario-related information. The base station may parse the first information in the CSI, to obtain the real number vector la, and input the real number vector la into the first decoder. An output of the first decoder may be a first weighting coefficient matrix, and the first weighting coefficient matrix is a real coefficient matrix or a complex coefficient matrix. The base station may perform space-frequency joint projection inverse transform on a complex coefficient matrix or a complex coefficient vector corresponding to a first weighting coefficient matrix, to obtain an eigen-subspace matrix H' of the downlink channel through reconstruction.

Figure 8:
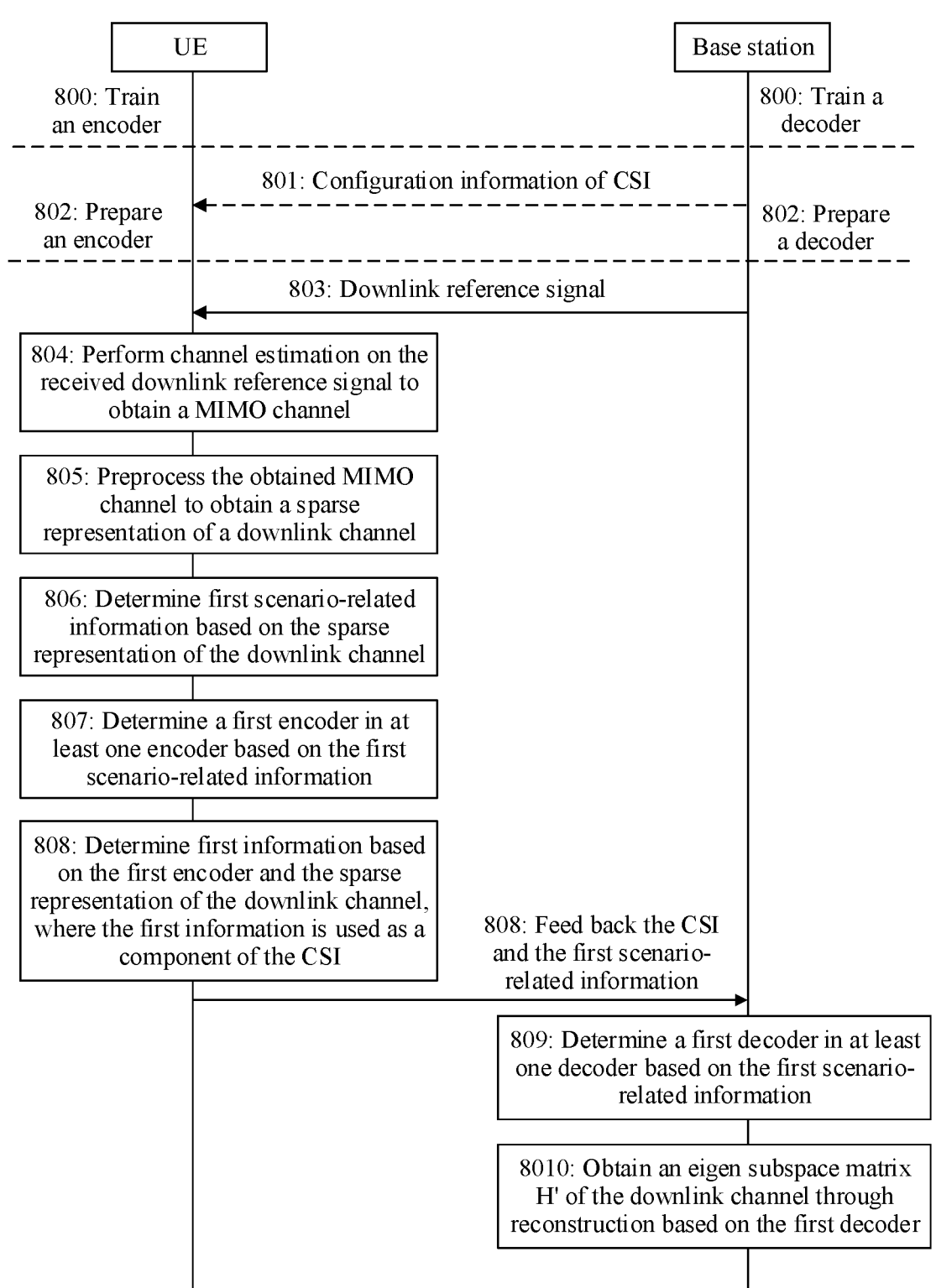
FIG. 8 is a flowchart of a communication method according to Embodiment 1 of this application.

It should be noted that in the schematic diagrams of CSI feedback mechanisms in FIG. 5. FIG. 7, and FIG. 8 in embodiments of this application, on a side of the UE, an example in which a quantizer is deployed outside an encoder is used, but is not limited to this. For example, the quantizer may alternatively be deployed inside the encoder.

In Embodiment 1, the encoder and the decoder are in pairs, and each pair of an encoder and/or a decoder may correspond to a different scenario. A corresponding scenario may be used in advance to train each pair of an encoder and a decoder, and a trained encoder and decoder are respectively deployed in the UE and the base station. Subsequently, the UE encodes the preprocessing result by using the first encoder of the scenario corresponding to the current downlink channel. The base station decodes, by using the decoder, namely, the first decoder, of the scenario corresponding to the current downlink channel, the real number vector la corresponding to the first information, to obtain the eigen-subspace matrix H' of the downlink channel through reconstruction. Because both the encoder and the decoder match the scenario of the current downlink channel, precision of the eigen-subspace matrix H' of the downlink channel obtained by the base station through reconstruction is high.

As shown in FIG. 8, a procedure of a communication method in Embodiment 1 is provided, and includes at least the following steps.

Optionally, step 800: train an encoder and a decoder, where the encoder and the decoder may be trained by a third-party device (for example, an AI device), or the encoder and the decoder may be respectively trained by UE and a base station. This is not limited. Training may be offline training, online training, or the like. This is not limited. Optionally, a trained encoder and decoder may be updated online.

For example, one or more groups of reference networks may be pre-trained, and each group of reference networks includes a pair of an encoder and a decoder. It should be noted that in Embodiment 1, each group of reference networks may correspond to a different scenario, and corresponding scenario-related information is used to train the encoder and the decoder in each reference network. For example, the one or more groups of reference networks may be trained by the third-party device. Then, before the UE is delivered from a factory, the encoder in each group of reference networks is deployed in the UE, and before the base station is delivered from the factory, the decoder in each group of reference networks is deployed in the base station. Optionally, the third-party device may subsequently update the encoder and the decoder in each reference network online. Alternatively, the UE and the base station may respectively train the encoder and the decoder offline or online. For example, a protocol may specify a network parameter, a weight, and the like of each group of reference networks. The UE and the base station respectively construct at least one encoder and at least one decoder based on the foregoing information specified in the protocol. Optionally, the protocol may further specify training data corresponding to each group of reference networks. The UE and the base station may train the encoder and the decoder in each group of reference networks based on the training data specified in the protocol.

Optionally, step 801: the base station sends configuration information of CSI to the UE, where the configuration information of the CSI may include a CSI resource setting, a CSI report setting (report quantity), and the like. The CSI resource setting may notify the UE of related information of a resource for measurement, and the CSI report setting may notify the UE to report a CSI format and the like.

For example, the configuration information of the CSI may indicate at least one of the following: a type of a reference signal used for measurement (for example, a channel state information reference signal (CSI-RS), or a synchronization signal and physical broadcast channel block (SSB)), a time domain resource and/or a frequency domain resource of the reference signal (for example, an index of the reference signal, a port number of the reference signal, and/or a periodicity of the reference signal), a CSI reporting format, a time domain frequency and/or a frequency domain resource used for CSI reporting, a trigger condition of CSI reporting, and/or a CSI reporting periodicity. Optionally, the configuration information of the CSI may further include scenario-related configuration information. For the scenario-related configuration information, refer to the descriptions in step 600.

Optionally, step 802: the UE and the base station respectively prepare the encoder and the decoder.

For example, if the scenario-related configuration information in step 801 indicates the UE to feed back the CSI based on scenario-related information, the base station and the UE may switch from a conventional CSI feedback procedure to a CSI feedback procedure based on the scenario-related information. In this process, the UE and the base station may respectively load the trained encoder and decoder in step 800 into an internal memory. A process in which the UE and the base station respectively load the trained encoder and decoder into the internal memory may be referred to as a process in which the UE and the base station respectively prepare the encoder and the decoder.

Step 803: the base station sends a downlink reference signal to the UE, where the downlink reference signal may include the CSI-RS, the SSB, or the like.

Step 804: the UE performs channel estimation on the received downlink reference signal, to obtain a downlink MIMO channel, where a dimension of a matrix of the downlink MIMO channel may be $N_{tx}*N_{rx}*N_{RB}$. $N_{tx}$ represents a quantity of transmit antenna ports, including transmit antenna ports in different polarization directions. $N_{rx}$ represents a quantity of receive antenna ports, including receive antenna ports in different polarization directions.

$N_{RB}$ represents a quantity of frequency domain sub-bands, and the quantity of frequency domain sub-bands may be determined based on an assumption that a pilot density for measurement is 1 RB.

Step 805: the UE preprocesses the matrix of the obtained downlink MIMO channel, to obtain a sparse representation $C_{complex}$ of a downlink channel. A purpose of preprocessing is generally to obtain the sparse representation $C_{complex}$ of the downlink channel, where $C_{complex}$ is a complex coefficient matrix, and each complex coefficient represents a projection coefficient. A process in which the UE performs preprocessing to obtain the sparse representation $C_{complex}$ of the downlink channel may include:

obtaining an eigen-subspace matrix H of the downlink channel based on the matrix $N_{tx}*N_{rx}*N_{RB}$ of the downlink MIMO channel. For example, dimension reduction may be performed, through SVD, on the matrix $N_{tx}*N_{rx}*N_{RB}$ of the downlink MIMO channel obtained in step 804, to obtain the eigen-subspace matrix H of the downlink channel, where H may be $N_{tx}*N_{sb}$-dimensional. $N_{sb}$ represents a quantity of frequency domain sub-bands, and a granularity of the frequency domain sub-band may be two resource blocks (RBs), four RBs, or the like. An example in which the granularity of the frequency domain sub-band is four RBs is used, where $N_{sb}=N_{RB}/4$.

Space-frequency joint projection is performed on the eigen-subspace matrix H of the downlink channel, to obtain the sparse representation $C_{complex}$ of the downlink channel. An example process is as follows:

1. Obtain a spatial domain base S and a frequency domain base F based on the eigen-subspace matrix H of the downlink channel.

For example, the eigen-subspace matrix H of the downlink channel is a complex number matrix of $H \in C^{N_{tx}*N_{sb}}$. Through discrete Fourier transform (DFT), two groups of DFT bases may be generated, which are respectively the spatial domain base S and the frequency domain base F. The spatial domain base $S \in C^{N_{tx}*N_{sb}}$ includes, for example, $N_{tx}$ $N_{tx}*1$-dimensional DFT column vectors, or when dual polarization is considered, the spatial domain base includes $N_{tx}$ $N_{tx}*1$-dimensional orthogonal column vectors. The frequency domain base $F \in C^{N_{sb}*N_{sb}}$ includes $N_{sb}$ $N_{sb}*1$-dimensional DFT column vectors. Optionally, the spatial domain base S and the frequency domain base F may be formed by oversampled DFT bases. For example, a plurality of groups of spatial domain bases $\{S_1, S_2, S_3 \ldots \}$ and a plurality of groups of frequency domain bases $\{F_1, F_2, F_3 \ldots \}$ may be generated by using different oversampling rates, and one group of $S_i$ and $F_j$ with an accurate projection direction are selected as the spatial domain base and the frequency domain base in some embodiments of this application.

2. Perform space-frequency joint projection on the eigen-subspace matrix H of the downlink channel by using the spatial domain base S and the frequency domain base F, to obtain the sparse representation $C_{complex}$ of the downlink channel. Optionally, the sparse representation $C_{complex}$ of the downlink channel may be a sparse representation of an eigen-subspace of an original downlink MIMO channel, and a dimension of the sparse representation of the downlink channel may be the same as a dimension of the eigen-subspace matrix H before projection, that is, $N_{tx}*N_{sb}$-dimensional. For an example process, refer to the following Formula 1:

$$C_{complex} = S^H * H * F, C_{complex} \in C^{N_{tx}*N_{sb}} \qquad \text{(Formula 1)}$$

In the foregoing Formula 1. $C_{complex}$ represents the sparse representation of the downlink channel. H represents the eigen-subspace matrix of the downlink channel. S and F respectively represent the spatial domain base and the frequency domain base. SH represents a Hermitian matrix of S, which is also referred to as a self-conjugate matrix, and may be obtained by performing conjugate transpose on the matrix S.

It should be noted that the foregoing preprocessing manner is merely an example for description, and is not intended to limit embodiments of this application. For example, in addition to the foregoing preprocessing manner, an eigen base may also be used as a projection base. Alternatively, the obtained sparse representation $C_{complex}$ of the downlink channel may be further compressed.

Step 806: the UE determines the first scenario-related information based on the sparse representation $C_{complex}$ of the downlink channel.

In some embodiments of this application, $C_{complex}$ is a complex coefficient matrix. Each complex coefficient represents a projection coefficient, and an energy value of the complex coefficient represents distribution of a channel on a two-dimensional plane formed by an angle ($N_{tx}$) and a delay ($N_{sb}$) to some extent.

When different UEs are in different channel environments, propagation paths of channels of the UEs are different. The most direct reaction is that energy distribution of coefficients is different on the angle-delay plane. Therefore, energy distribution of angle-delay domain projection coefficients of the channel may be used to determine the scenario corresponding to the current downlink channel. The method may be referred to as a method for classifying, through a hard decision, scenarios corresponding to a downlink channel.

For example, for a complex coefficient matrix of $C_{complex} \in C^{N_{tx}*N_{sb}}$, there are a total of $N_{tx}*N_{sb}$ complex coefficients, and an energy matrix $P \in R^{N_{tx}*N_{sb}}$ of the $N_{tx}*N_{sb}$ complex coefficients may be obtained. In some embodiments of this application, it may be considered that the energy matrix P also includes $N_{tx}*N_{sb}$ coefficients. A difference is that each coefficient represents an energy value. In some embodiments of this application, the UE may calculate a sum of $N_{tx}*N_{sb}$ coefficients, which is referred to as a sum of energy. An energy ratio coefficient $\rho$ is defined as a ratio of the energy of the coefficient to the sum of energy. Scenarios corresponding to the downlink channel are classified based on a value interval of the energy ratio coefficient $\rho$.

For example, there may be four types of scenarios. A first type of scenario includes a line of sight (LoS) path scenario, and sparsity of the first type of scenario is the best among the four types of scenarios. A second type of scenario includes a scenario in which there is a single strong path in two polarization directions. A third type of scenario includes a scenario having a delay spread. A fourth type of scenario includes a scenario having rich angle domain and delay domain extension, and sparsity of the fourth type of scenario is the worst among the four types of scenarios. This is merely an example, and a division manner is not limited.

For example, it may be preset that $\rho$ of the first type of scenario is greater than a first threshold, for example, 10%, $\rho$ of the second type of scenario is greater than a second threshold, for example, 15%, $\rho$ of the third type of scenario is greater than a third threshold, for example, 12%, and the remaining are the fourth type of scenario. In some embodiments of this application, when obtaining the energy matrix P, the UE may calculate an energy ratio coefficient $\rho$ of the energy matrix P according to the following Formula 2. If the energy matrix P satisfies the following Formula 2, that is, the calculated energy ratio coefficient $\rho$ is greater than the first threshold, it may be determined that the scenario corresponding to the current downlink channel is the first type of scenario, and the first scenario-related information subsequently sent by the UE to the base station may be indication information of the first type of scenario.

$$\rho_{class\,1} = \frac{P_{top1}}{P_{sum}} > \text{first threshold} \qquad \text{(Formula 2)}$$

In the foregoing Formula 2, $\rho_{class1}$ represents the energy ratio coefficient $\rho$, $P_{sum}$ represents total energy of all coefficients in the energy matrix P, and $P_{top1}$ represents a coefficient with largest energy in coefficients in the energy matrix P.

If the energy matrix P does not satisfy the foregoing Formula 2, the UE may continue to calculate the energy ratio coefficient $\rho$ of the energy matrix P according to the following Formula 3. If the energy matrix P satisfies the following Formula 3, that is, the calculated energy ratio coefficient $\rho$ is greater than the second threshold, it may be determined that the scenario corresponding to the current downlink channel is the second type of scenario, and the first scenario-related information sent by the UE to the base station may be indication information of the second type of scenario.

$$\rho_{class\,2} = \frac{P_{top1} + P_{top2}}{P_{sum}} > \text{second threshold} \qquad \text{(Formula 3)}$$

In the foregoing Formula 3, $\rho_{class2}$ represents the energy ratio coefficient $\rho$, $P_{sum}$ represents the total energy of all coefficients in the energy matrix P. $P_{top1}$ and $P_{top2}$ respectively represent a coefficient with largest energy and a coefficient with second largest energy in coefficients in the energy matrix P.

If the energy matrix P does not satisfy the foregoing Formula 3, the UE may continue to calculate the energy ratio coefficient $\rho$ of the energy matrix P according to the following Formula 4. If the energy matrix P satisfies the following Formula 4, that is, the calculated energy ratio coefficient $\rho$ is greater than the third threshold, it may be determined that the scenario corresponding to the current downlink channel is the third type of scenario, and the first scenario-related information sent by the UE to the base station may be indication information of the third type of scenario.

$$\rho_{class\,3} = \frac{P_{top1} + P_{top2} + P_{top3} + P_{top4}}{P_{sum}} > \text{third threshold} \qquad \text{(Formula 4)}$$

In the foregoing Formula 4, $\rho_{class3}$ represents the energy ratio coefficient $\rho$, $P_{sum}$ represents the total energy of all coefficients in the energy matrix P, $P_{top1}$, $P_{top2}$, $P_{top3}$, and $P_{top4}$ respectively represent a coefficient with largest energy, a coefficient with second largest energy, a coefficient with third largest energy, and a coefficient with fourth largest energy in coefficients in the energy matrix P.

If the energy matrix P still does not satisfy the foregoing Formula 4, the UE may determine that the scenario corresponding to the current downlink channel is the fourth type of scenario, and the first scenario-related information sent by the UE to the base station may be indication information of the fourth type of scenario.

Step 807: the UE determines a first encoder in at least one encoder based on the first scenario-related information.

For example, the at least one encoder deployed in the UE may correspond to a different scenario. The UE may select, from the at least one encoder, an encoder corresponding to the scenario indicated by the first scenario-related information, and the encoder is referred to as the first encoder.

Step 808: the UE determines first information based on the first encoder and the sparse representation $C_{complex}$ of the downlink channel, where the first information is used as a component of the CSI, and the UE feeds back the first scenario-related information and the CSI to the base station.

The sparse representation $C_{complex}$ of the downlink channel is a complex coefficient matrix, and a real part and an imaginary part of the complex coefficient matrix $C_{complex}$ may be obtained, and then matrix concatenation is performed to obtain a real coefficient matrix $C \in \mathcal{R}^{N_{tx}*N_{sb}*2}$. The real coefficient matrix $C \in \mathcal{R}^{N_{tx}*N_{sb}*2}$ may be used as an input of the first encoder. In some embodiments of this application, the first encoder is mainly configured to implement an information compression function, and an output dimension of the first encoder mainly depends on a format of the first encoder. For example, in some embodiments of this application, the output of the first encoder may be represented as la, and la may be a real number vector (la $\in \mathcal{R}^{M+1}$) with a length of M, where $M \leq N_{tx}*N_{sb}*2$.

It should be noted that the real coefficient matrix $C \in \mathcal{R}^{N_{tx}*N_{sb}*2}$, which is the input of the first encoder, is three-dimensional. In a sequence, the three dimensions respectively represent a quantity of transmit antennas, a quantity of frequency domain sub-bands, and real and imaginary parts. The sequence of the three dimensions mainly depends on an input format of the first encoder. For example, the three dimensions may be $2*N_{tx}*N_{sb}$ or another sequence. This is not limited. In a design, the UE may transform la output by the first encoder into a bit stream through quantization, and the bit stream is used as the first information, may form content of the CSI together with a PMI, a CQI, an RI, and the like, and the CSI is fed back to the base station. The UE may further feed back the first scenario-related information to the base station. For example, the UE may determine, based on the scenario configuration information in step 801, a quantity of bits occupied by the first scenario-related information, a format of the first scenario-related information, or the like. Optionally, the first scenario-related information may be fed back to the base station together with the CSI. For example, the first scenario-related information may be used as a component of the first information, and is fed back to the base station together with the CSI.

Step 809: the base station selects a first decoder from at least one decoder based on the first scenario-related information.

For example, the base station may select, from the at least one decoder, a decoder corresponding to the scenario indicated by the first scenario-related information, and the decoder is referred to as the first decoder. An example in which the first scenario-related information is fed back to the base station together with the CSI is used. The base station may parse the CSI, to obtain a real number sequence, where the real number sequence includes the output la of the first encoder and the first scenario-related information seen. Subsequently, the base station may select the first decoder based on the first scenario-related information seen.

Step 8010: the base station obtains the eigen-subspace matrix H' of the downlink channel through reconstruction based on the first decoder.

For example, the base station may input the real number vector la into the first decoder, to obtain a first weighting coefficient matrix. The first weighting coefficient matrix may be a real coefficient matrix output by the first decoder, and an output of the first decoder may be represented as the real coefficient matrix $\tilde{C} \in \mathcal{R}^{N_{tx}*N_{sb}*2}$. The base station may perform space-frequency joint projection inverse transform on a complex coefficient matrix or a complex coefficient vector corresponding to the real coefficient matrix, to obtain the eigen-subspace matrix H' of the downlink channel through reconstruction. For example, the base station may transform the real coefficient matrix $\tilde{C} \in \mathcal{R}^{N_{tx}*N_{sb}*2}$ into the complex coefficient matrix $\tilde{C}_{complex} \in \mathcal{C}^{N_{tx}*N_{sb}}$, and then perform space-frequency joint projection inverse transform according to the following Formula 5, to obtain the eigen-subspace matrix H' of the downlink channel through reconstruction.

$$H' = S * \tilde{C}_{complex} * F^H, H' \in \mathcal{C}^{N_{tx}*N_{sb}} \qquad \text{(Formula 5)}$$

In the foregoing Formula 5, H' represents the reconstructed eigen-subspace matrix of the downlink channel. S and F respectively represent the spatial domain base and the frequency domain base. FH represents a Hermitian matrix of F, which is also referred to as a self-conjugate matrix, and may be obtained by performing conjugate transpose on the matrix F. $\tilde{C}_{complex}$ represents the complex coefficient matrix transformed based on the real coefficient matrix output by the first decoder.

In a design, an example in which the base station performs space-frequency joint projection inverse transform on the complex coefficient matrix corresponding to the real coefficient matrix output by the first decoder, to obtain the eigen-subspace matrix H' of the downlink channel through reconstruction is used. For a process of obtaining the eigen-subspace matrix H' of the downlink channel through reconstruction, refer to the following Formula 6.

$$H' = \sum_{k=1}^{K}\sum_{l=1}^{L}C(f_{dec-scen}(la)) * U_{1,k} * U_{2,l}^* \qquad \text{(Formula 6)}$$

In the foregoing Formula 6, H' represents the eigen-subspace matrix of the downlink channel. $U_{1,k}$ represents a $k^{th}$ column vector in a basis vector set in a spatial domain direction, k=1, . . . , K, the basis vector set in the spatial domain direction includes K column vectors, and K is a positive integer. $U_{2,1}^*$ represents conjugate transpose on an $l^{th}$ column vector in a basis vector set in a frequency domain direction, l=1, . . . , L, the basis vector set in the frequency domain direction includes L column vectors, and L is a positive integer. la represents the first information. The function $f_{dec-scen}(\cdot)$ represents the first decoder corresponding to the first scenario-related information, and the first decoder is configured to perform decoding based on the first information. The function $C(\cdot)$ represents an output of the first decoder as a complex coefficient matrix. $\Sigma(\cdot)$ represents that coefficients obtained by performing space-frequency joint projection inverse transform on the matrix are summed. It should be noted that in this design, the output of the first decoder may be a real coefficient matrix or a complex coefficient matrix. If the output of the first decoder is the real coefficient matrix, the foregoing function $C(\cdot)$ may transform the real coefficient matrix output by the first decoder into the complex coefficient matrix. Alternatively, if the output of the first decoder is directly the complex coefficient matrix, the function $C(\cdot)$ does not need to perform transformation.

For example, in an implementation, la represents the first information fed back by the UE, and may be used as an input of the first decoder, seen represents the first scenario-related information, and is indication information. The function $f_{dec-scen}(\cdot)$ represents the first decoder corresponding to the first scenario-related information, and the first decoder is configured to determine a real coefficient matrix based on the real number vector la corresponding to the first information, where the real coefficient matrix may be K*L*2-dimensional. The function $C(\cdot)$ represents that the real coefficient matrix output by the first decoder is transformed into a complex coefficient matrix, and the complex coefficient matrix may be K*L-dimensional.

It should be noted that in the foregoing Formula 6, the output of the first decoder may be a K*L*2-dimensional matrix. After a third dimension representing the real part and the imaginary part is removed. K and L respectively represent a quantity of coefficients in a spatial domain dimension and a quantity of coefficients in a frequency domain dimension. In addition, it may be deduced that during preprocessing in step 805, a proper practice is to ensure that the $C_{complex}$ is a two-dimensional matrix. In other words, if the base station obtains, by using the foregoing Formula 6, the eigen-subspace matrix H' of the downlink channel through reconstruction, during preprocessing, the UE may need to ensure that the sparse representation $C_{complex}$ of the downlink channel is a two-dimensional matrix.

Alternatively, in another design, an example in which the base station performs space-frequency joint projection inverse transform on the complex coefficient vector corresponding to the real coefficient matrix output by the first decoder, to obtain the eigen-subspace matrix H' of the downlink channel through reconstruction is used. For a process of obtaining the eigen-subspace matrix H' of the downlink channel through reconstruction, refer to the following Formula 7:

$$H' = \sum_{j=1}^{J}C(f_{dec-scen}(la))|_j * U_{1,j} * U_{2,j}^* \qquad \text{(Formula 7)}$$

In the foregoing Formula 7, H' represents the eigen-subspace matrix of the downlink channel. la represents the first information. The function $f_{dec-scen}(\cdot)$ represents the first decoder corresponding to the first scenario-related information, and the first decoder is configured to perform decoding based on the first information. The function $C(\cdot)$ represents an output of the first decoder as a complex coefficient matrix. $C(\cdot)|_j$ represents a $j^{th}$ complex coefficient in the complex coefficient matrix, j=1, . . . , J, the complex coefficient matrix includes J complex coefficients, $J \leq K \times L$, and K and L are positive integers. $U_{1,j}$ represents a column vector that is in a basis vector set in a spatial domain direction and that corresponds to $C(\cdot)|_j$, and the basis vector set in the spatial domain direction includes K column vectors. $U_{2,j}^*$ represents conjugate transpose on a column vector that is in a basis vector set in a frequency domain direction and that corresponds to $C(\cdot)|_j$, and the basis vector set in the frequency domain direction includes L column vectors. Optionally, in the foregoing Formula 7, the output of the first decoder may be a real coefficient matrix or a complex coefficient matrix. If the output of the first decoder is the real coefficient matrix, the foregoing function $C(\cdot)$ may transform the real coefficient matrix output by the first decoder into the complex coefficient matrix. Alternatively, if the output of the first decoder is directly the complex coefficient matrix, the function $C(\cdot)$ does not need to perform transformation.

For example, in an implementation, la represents the first information fed back by the UE, and may be used as an input of the first decoder, seen represents the first scenario-related information, and is indication information. The function $f_{dec-scen}(\cdot)$ represents the first decoder corresponding to the first scenario-related information, and the first decoder is configured to determine a real coefficient matrix based on the real number vector la corresponding to the first information. For example, the real coefficient matrix may be J*2-dimensional. The function $C(\cdot)$ represents that the real coefficient matrix output by the first decoder is transformed into a complex coefficient matrix. For example, the complex coefficient matrix may include a complex coefficient vector with a length of J. $C(\cdot)|_j$ represents that the complex coefficient vector includes J complex coefficients, and a $j^{th}$ complex coefficient is taken, where $j \in J, J \leq K \times L$. $U_1$ represents a basis vector set in a spatial domain direction, including K $N_{tx}$-dimensional column vectors. $U_2$ represents a basis vector set in a frequency domain direction, including L $N_{sb}$-dimensional column vectors. $U_{1,j}$ represents a column vector in $U_{1,j}$ corresponding to the $j^{th}$ complex coefficient. $U_{2,j}$ represents a column vector in $U_2$ corresponding to the $j^{th}$ complex coefficient. Any value of j uniquely corresponds to a group of values (k, l), which represents a two-dimensional coordinate point on a K*L plane, where $K \in 1 \ldots K$, $l \in 1 \ldots L$, k represents a $k^{th}$ column vector in $U_1$, and l represents an $l^{th}$ column vector in $U_2$.

In Embodiment 1, a scenario hard decision is based on a coefficient energy ratio of a sparse angle-delay domain as a decision threshold, so that users in a networking scenario can be effectively classified, which is equivalent to adding an eigen. This facilitates convergence of a neural network, and improves reconstruction precision of the CSI fed back based on the neural network.

Embodiment 2

Figure 9:
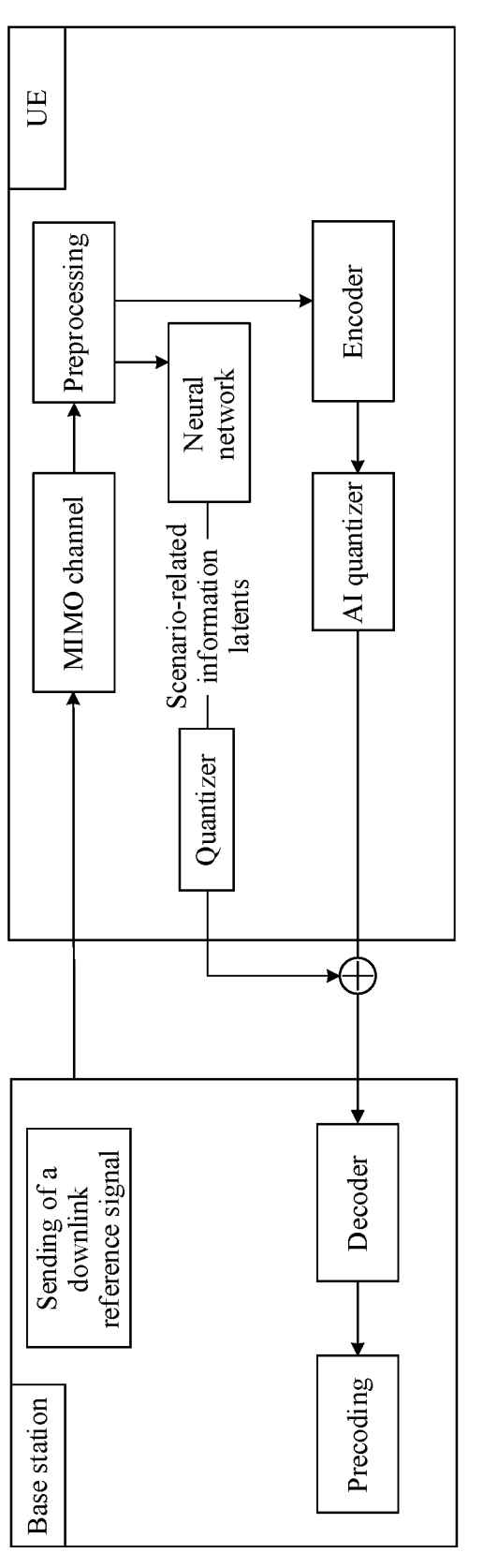
FIG. 9 is a schematic diagram of a structure of feeding back CSI according to Embodiment 2 of this application.

FIG. 9 is a schematic diagram of a framework of a CSI feedback mechanism. UE may receive a downlink reference signal from a base station, measure the downlink reference signal, to obtain a downlink MIMO channel, preprocess a matrix of the downlink MIMO channel, and may obtain an eigen-subspace matrix H of a downlink channel. The UE determines first scenario-related information based on a preprocessing result. The first scenario-related information may indicate N probability values, and each of the N probability values corresponds to one scenario. Optionally, a sum of the N probability values is less than or equal to 1. The UE sends the first scenario-related information to the base station. The UE inputs the preprocessing result to a second encoder, and an output of the second encoder may be a real number vector la. The real number vector la is quantized and transformed into a bit stream, which is used as the first information, forms CSI together with a PMI, a CQI, an RI, and the like, and the CSI is fed back to the base station.

Optionally, in this design, because the CSI and the first scenario-related information have different quantization precision requirements, a dedicated quantizer may be separately designed to quantize the first scenario-related information. The base station may parse the CSI, to obtain the real number vector la and the first scenario-related information latents, and input the real number vector la and the first scenario-related information latents to the second decoder. An output of the second decoder may be a second weighting coefficient matrix. The base station may perform space-frequency joint projection inverse transform on a complex coefficient matrix or a complex coefficient vector corresponding to a second weighting coefficient matrix, to obtain an eigen-subspace matrix H' of the downlink channel through reconstruction.

Figure 10:
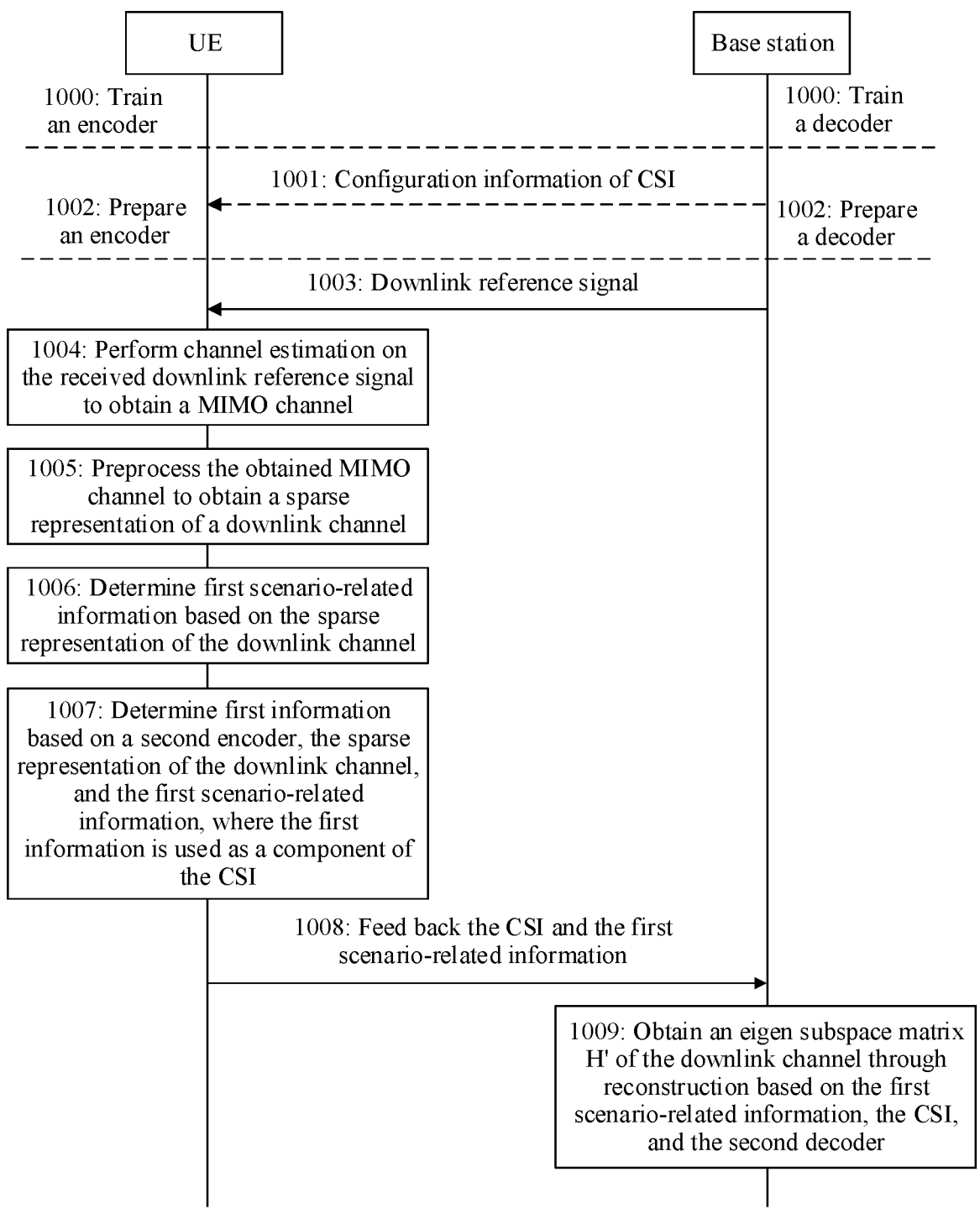
FIG. 10 is a flowchart of a communication method according to Embodiment 2 of this application.

As shown in FIG. 10, a procedure of a communication method according to Embodiment 2 is provided, and includes at least the following steps.

Optionally, step 1000: train an encoder and a decoder.

Optionally, step 1001: a base station sends configuration information of CSI to UE.

Optionally, step 1002: the UE and the base station respectively prepare the encoder and the decoder.

Step 1003: the base station sends a downlink reference signal to the UE.

For descriptions of step 1000 to step 1003, refer to descriptions of step 800 to step 803. Different from the foregoing Embodiment 1, in Embodiment 2, an encoder may be deployed in the UE, and the encoder may be referred to as the second encoder, and a decoder may be deployed in the base station, and the decoder may be referred to as the second decoder. In the foregoing Embodiment 1, there is a correspondence between the encoder and/or the decoder and the scenario corresponding to the downlink channel. A difference is that in Embodiment 2, the second encoder and the second decoder may be applicable to any scenario of the downlink channel. A difference may be that when the second decoder performs decoding, in addition to inputting, into the second decoder, the real number vector la corresponding to the first information, the first scenario-related information further needs to be input into the second decoder. For details, refer to the following descriptions.

Step 1004: the UE performs channel estimation on the received downlink reference signal, to obtain a downlink MIMO channel.

Step 1005: the UE preprocesses a matrix of the obtained downlink MIMO channel, to obtain a sparse representation $C_{complex}$ of a downlink channel.

For step 1004 and step 1005, refer to step 804 and step 805 in Embodiment 1.

Step 1006: the UE determines the first scenario-related information based on the sparse representation $C_{complex}$ of the downlink channel.

In Embodiment 2, the first scenario-related information is a group of probabilities and indicates N probability values, and each of the N probability values corresponds to one scenario. In some embodiments of this application, the UE may pre-store X scenario labels, where a value of X is greater than or equal to that of N. The pre-stored scenario labels may be delivered by the base station or agreed in a protocol. This is not limited. The UE may feed back probabilities of similarities between all of the X scenario labels and the current downlink channel. In this case, a value of X is equal to that of N, and a sum of N probability values in the first scenario-related information fed back by the UE is equal to 1. Alternatively, the UE may feed back probabilities of similarities between some of the X scenario labels and the current downlink channel. In this case, a value of X is greater than that of N, and a sum of N probability values in the first scenario-related information fed back by the UE is less than 1. Optionally, the base station may notify the UE of the value of N. For example, the base station may notify the UE of the value of N by using RRC signaling, a broadcast message, a MAC CE, downlink control information (DCI), or the like.

For example, the UE may pre-store four scenario labels. The pre-stored scenario labels may be delivered by the base station or agreed in a protocol. This is not limited. The UE may input, into a neural network, a real coefficient matrix corresponding to the sparse representation $C_{complex}$ of the downlink channel. An output of the neural network may be the first scenario-related information. In Embodiment 2, a structure of the neural network is not limited. For example, the neural network may be configured to calculate a correlation between the real coefficient matrix corresponding to the sparse representation $C_{complex}$ of the current downlink channel and four pre-stored scenario labels, and probabilities of similarities between the real coefficient matrix corresponding to the sparse representation $C_{complex}$ of the current downlink channel and sample labels are output by using a softmax function. Therefore, in Embodiment 2, the first scenario-related information may be a group of probabilities. For example, the first scenario-related information may be represented as Latents=$\{p_1, p_2, p_3, p_4\}$. Latents represents the first scenario-related information, and $p_i$ represents a probability of a similarity between the current downlink channel and an $i^{th}$ scenario label.

Step 1007: the UE determines the first information based on the second encoder, the sparse representation $C_{complex}$ of the downlink channel, and the first scenario-related information, where the first information may be used as a component of the CSI.

For example, the sparse representation $C_{complex}$ of the downlink channel is a complex coefficient matrix, and the complex coefficient matrix may be transformed into a real coefficient matrix. For a transformation process, refer to records of the foregoing Embodiment 1. The UE uses the real coefficient matrix as an input of the second encoder, and the output of the second encoder may be represented as la. Similar to the foregoing Embodiment 1, the UE may transform la output by the second encoder into a bit stream through quantization, which is used as the first information, forms the CSI together with a PMI, a CQI, an RI, and the like, and the CSI is fed back to the base station. Optionally, the first scenario-related information may be fed back to the base station together with the CSI. For example, the first scenario-related information may be used as an information element of the CSI, or the first scenario-related information may be fed back independently, or the like. This is not limited.

Step 1008: the UE feeds back the CSI and the first scenario-related information to the base station.

Step 1009. The base station obtains the eigen-subspace matrix H' of the downlink channel through reconstruction based on the first scenario-related information, the CSI, and the second decoder.

For example, if the first scenario-related information is fed back to the base station together with the CSI, the base station may parse the received CSI, to obtain a real number sequence. The real number sequence includes the output la of the second encoder and the first scenario-related information Latents. The base station may input la and the first scenario-related information Latents into the second decoder, to obtain a second weighting coefficient matrix. The second weighting coefficient matrix may be a real coefficient matrix output by the second decoder, and an output of the second decoder may be represented as a real coefficient matrix $\check{C} \in \mathcal{R}^{N_{tx}*N_{sb}*2}$. The base station may perform space-frequency joint projection inverse transform on a complex coefficient matrix or a complex coefficient vector corresponding to the second weighting coefficient matrix, to obtain the eigen-subspace matrix H' of the downlink channel through reconstruction.

For example, the base station may perform space-frequency joint projection inverse transform on the complex coefficient matrix corresponding to the real coefficient matrix output by the second decoder, to obtain the eigen-subspace matrix H' of the downlink channel through reconstruction. Refer to the following Formula 8:

$$H' = \sum_{k=1}^{K}\sum_{l=1}^{L} C(f_{dec}(la, \text{latents})) * U_{1,k} * U_{2,l}^* \qquad \text{(Formula 8)}$$

In the foregoing Formula 8, H' represents the eigen-subspace matrix of the downlink channel. $U_{1,k}$ represents a $k^{th}$ column vector in a basis vector set in a spatial domain direction, k=1, . . . , K, the basis vector set in the spatial domain direction includes K column vectors, and K is a positive integer. $U^*_{2,l}$ represents conjugate transpose on an $l^{th}$ column vector in a basis vector set in a frequency domain direction, l=1, . . . , L, the basis vector set in the frequency domain direction includes L column vectors, and L is a positive integer. la represents the first information. latents represents the first scenario-related information, indicating a group of probabilities. The function $f_{dec}(\cdot)$ represents the second decoder, and the second decoder is configured to perform decoding based on the first information and the first scenario-related information. The function $C(\cdot)$ represents an output of the second decoder as a complex coefficient matrix. Optionally, the output of the second decoder may be a real coefficient matrix or a complex coefficient matrix. If the output of the second decoder is the real coefficient matrix, the foregoing function $C(\cdot)$ may transform the real coefficient matrix output by the second decoder into the complex coefficient matrix. Alternatively, if the output of the second decoder is directly the complex coefficient matrix, the function $C(\cdot)$ does not need to perform transformation.

For example, in an implementation, la represents the first information fed back by the UE and may be used as an input of the first decoder. latents represents the first scenario-related information and is a group of pieces of probability information. The function $f_{dec}(\cdot)$ represents the second decoder, and the second decoder is configured to output a real coefficient matrix based on the first scenario-related information latents and the real number vector la corresponding to the first information, where the real coefficient matrix may be K*L*2-dimensional, and 2 represents a real part and an imaginary part. The function $C(\cdot)$ represents that the real coefficient matrix output by the second decoder is transformed into a complex coefficient matrix. For example, the complex coefficient matrix may be K*L-dimensional.

It should be noted that in the foregoing Formula 8, the output of the second decoder may be a K*L*2-dimensional matrix. After a third dimension representing the real part and the imaginary part is removed, K and L respectively represent a quantity of coefficients in a spatial domain dimension and a quantity of coefficients in a frequency domain dimension. In addition, it may be deduced that during preprocessing in step 1005, a proper practice is to ensure that the $C_{complex}$ is a two-dimensional matrix.

Alternatively; the base station may perform space-frequency joint projection inverse transform on the complex coefficient vector corresponding to the real coefficient matrix output by the second decoder, to obtain the eigen-subspace matrix H' of the downlink channel through reconstruction. Refer to the following Formula 9:

$$H' = \sum_{j=1}^{J} C(f_{dec}(la, \text{latents}))|_j * U_{1,j} * U_{2,j}^* \qquad \text{(Formula 9)}$$

In the foregoing Formula 9, H' represents the eigen-subspace matrix of the downlink channel. la represents the first information. latents represents the first scenario-related information, indicating a group of probabilities. The function $f_{dec}(\cdot)$ represents the second decoder, and the second decoder is configured to perform decoding based on the first information and the first scenario-related information. The function $C(\cdot)$ represents an output of the second decoder as a complex coefficient matrix. $C(\cdot)|_j$ represents a $j^{th}$ complex coefficient in the complex coefficient matrix, j=1, . . . , J, the complex coefficient matrix includes J complex coefficients, J≤K×L, and K and L are positive integers. $U_{1,j}$ represents a column vector that is in a basis vector set in a spatial domain direction and that corresponds to $C(\cdot)|_j$, and the basis vector set in the spatial domain direction includes K column vectors. $U^*_{2,j}$ represents conjugate transpose on a column vector that is in a basis vector set in a frequency domain direction and that corresponds to $C(\cdot)|_j$, and the basis vector set in the frequency domain direction includes L column vectors. Optionally, the output of the second decoder may be a real coefficient matrix or a complex coefficient vector. If the output of the second decoder is the real coefficient matrix, the foregoing function $C(\cdot)$ may transform the real coefficient matrix output by the second decoder into the complex coefficient vector. Alternatively, if the output of the second decoder is directly the complex coefficient vector, the function $C(\cdot)$ does not need to perform transformation.

For example, in an example, la represents the first information fed back by the UE, and may be used as an input of the second decoder. latents represents the first scenario-related information, and is a group of pieces of probability information. The function $f_{dec}(\cdot)$ represents the second decoder, and the second decoder is configured to output a real coefficient matrix based on the first scenario-related information latents and the real number vector la corresponding to the first information, where the real coefficient matrix may be J*2-dimensional, and 2 represents a real part and an imaginary part. The function $C(\cdot)$ represents an output of the second decoder as a complex coefficient matrix. $C(\cdot)|$ represents that the complex coefficient vector includes J complex coefficients, and a $j^{th}$ complex coefficient is taken, where $j\in J, J\le K\times L$. $U_1$ represents a basis vector set in a spatial domain direction, including K $N_{tx}$-dimensional column vectors. $U_2$ represents a basis vector set in a frequency domain direction, including L $N_{sb}$-dimensional column vectors. $U_{1,j}$ represents a column vector in $U_1$ corresponding to the $j^{th}$ complex coefficient. $U_{2,j}$ represents a column vector in $U_2$ corresponding to the $j^{th}$ complex coefficient. Any value of j uniquely corresponds to a group of values (k, l), which represents a two-dimensional coordinate point on a K*L plane, where $K\in 1 \ldots K, l\in 1 \ldots L$, k represents a $k^{th}$ column vector in $U_1$, and l represents an $l^{th}$ column vector in $U_2$.

It should be noted that in the foregoing Formula 9, the output of the second decoder may be a J*2-dimensional matrix. After a second dimension representing the real part and the imaginary part is removed. J represents a combinatorial number of coefficients in a spatial domain dimension and a frequency domain dimension. In addition, it may be deduced that during preprocessing in step 1005, a proper practice is to ensure that $C_{complex}$ is a one-dimensional vector.

In Embodiment 2, a scenario decision method is a method to calculate probability distribution of a similarity between the eigen-subspace matrix and a scenario-related eigen sample, and a computing module and a network are jointly trained, so that scenario division may be automatically performed on a sample with rich eigens, thereby facilitating better convergence of a neural network and further improving reconstruction precision of the CSI fed back based on the neural network. Optionally, in Embodiment 2, a plurality of encoders do not need to be deployed in the UE, and only one encoder, namely, the second encoder, may be deployed. Similarly, a plurality of decoders do not need to be deployed in the base station, and only one decoder, namely, the second decoder, may be deployed.

In Embodiment 1 and Embodiment 2, simulation verification shows that compared with a conventional CSI feedback solution, a CSI feedback of a CSI feedback mechanism based on a scenario-related manner is more accurate, and a system-level performance gain exists. The system-level performance gain means that in a multi-user scenario, a larger gain may be obtained in the solutions in Embodiment 1 and Embodiment 2 of this application, and the multi-user scenario is closer to a networking scenario deployed actually. Although in the conventional CSI feedback solution, a relatively large gain can be obtained, the gain is usually obtained in a single-user (SU) scenario, and a gain is relatively small obtained in the MU scenario. In other words, the methods in embodiments of this application are applied to an actual networking scenario. Compared with the conventional CSI feedback solution, a relatively large gain can be obtained, and CSI feedback accuracy is relatively high.

It should be noted that in the foregoing described embodiments, an example in which the encoder and the decoder are deployed in the UE and the base station is used for description. Actually, the encoder and/or the decoder may be deployed in a third-party device, and the third-party device may be referred to as an AI node. An example in which the encoder is deployed in the third-party device is used. The UE may send the preprocessing result to the third-party device, and the third-party device inputs the preprocessing result into the encoder, and sends an output result of the encoder to the UE. An example in which the decoder is deployed in the third-party device is used. The base station may send a parsing result la of the CSI to the third-party device. The third-party device inputs la into the decoder, and returns an output result of the decoder to the base station. It should be noted that in Embodiment 2, a neural network may be required to participate in a process of determining the first scenario-related information. Similarly, the neural network configured to determine the first scenario-related information may be deployed in the third-party device.

It should be noted that in the foregoing descriptions, an example in which a hardware device is used as a whole is used for description, and actions of modules in the hardware device are not described. To support the hardware device as a whole in implementing related functions described in the foregoing embodiments, it is assumed that an operation between modules in the hardware device also falls within the protection scope of embodiments of this application.

For example, in a design, as an open radio access network (O-RAN) is proposed, a function of an access network device may be implemented by a plurality of universal standard modules. As shown in FIG. 2b, a function of the base station may be implemented by a CU module or a DU module. For example, for the procedure shown in FIG. 6, an implementation of the procedure includes: the DU receives the first information and the first scenario-related information of the downlink channel from the terminal device. The DU sends the first information and the first scenario-related information to the CU. The CU determines the second information of the downlink channel and the like based on the first scenario-related information and the first information.

The foregoing describes in detail the methods provided in embodiments of this application with reference to FIG. 1 to FIG. 10. The following describes in detail apparatuses provided in embodiments of this application with reference to FIG. 11 and FIG. 13. It should be understood that the descriptions of apparatus embodiments correspond to the descriptions of the method embodiments. For content not described in detail, refer to the descriptions in the foregoing method embodiments.

Figure 11:
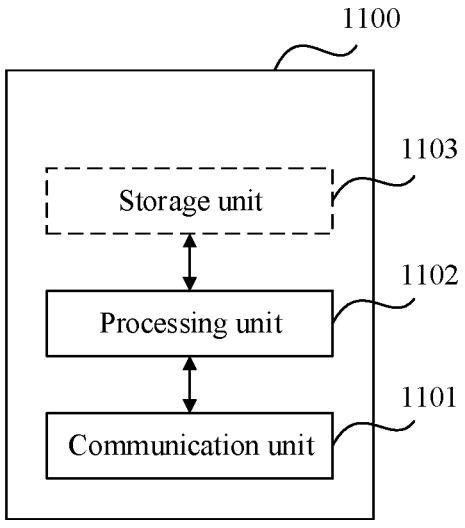
FIG. 11 is a schematic diagram of a structure of an apparatus according to an embodiment of this application.

FIG. 11 is a possible block diagram of an apparatus according to an embodiment of this application. As shown in FIG. 11, an apparatus 1100 may include a communication unit 1101, configured to support communication between the apparatus and another device. Optionally, the communication unit 1101 is also referred to as a transceiver unit, including a receiving unit and/or a sending unit, respectively configured to perform a receiving operation and a sending operation. A processing unit 1102 is configured to support the apparatus in performing processing. Optionally, the apparatus 1100 may further include a storage unit 1103, configured to store program code and/or data of the apparatus 1100.

In the first embodiment, the apparatus 1100 may be a network device or a module, a chip, or a circuit in a network device. The communication unit 1101 is configured to perform sending/receiving-related operations of the base station in the foregoing method embodiment. The processing unit 1102 is configured to perform processing-related operations of the base station in the foregoing method embodiment.

For example, the communication unit 1101 receives first information and first scenario-related information of a downlink channel from a terminal device. The processing unit 1102 is configured to determine second information of the downlink channel based on the first scenario-related information and the first information.

In a possible design, the first scenario-related information indicates identification information of a scenario corresponding to the downlink channel.

In a possible design, that the processing unit 1102 determines second information of the downlink channel based on the first scenario-related information and the first information includes: determining a first decoder in at least one decoder based on the first scenario-related information; and obtaining the second information of the downlink channel based on the first information and the first decoder.

In a possible design, the obtaining the second information of the downlink channel based on the first information and the first decoder includes: obtaining a first weighting coefficient matrix based on the first information and the first decoder; and performing space-frequency joint projection inverse transform on a complex coefficient matrix or a complex coefficient vector corresponding to the first weighting coefficient matrix, to determine the second information.

In a possible design, the second information includes an eigen-subspace matrix H' of the downlink channel, and the determined eigen-subspace matrix H' of the downlink channel satisfies the following formula:

$$H' = \sum_{k=1}^{K} \sum_{l=1}^{L} C(f_{dec-scen}(la)) * U_{1,k} * U_{2,l}^*$$

H' represents the eigen-subspace matrix of the downlink channel. $U_{1,k}$ represents a $k^{th}$ column vector in a basis vector set in a spatial domain direction, k=1, . . . , K, the basis vector set in the spatial domain direction includes K column vectors, and K is a positive integer. $U_{2,1}^*$ represents conjugate transpose on an $1^{th}$ column vector in a basis vector set in a frequency domain direction, l=1, . . . , L, the basis vector set in the frequency domain direction includes Z column vectors, and L is a positive integer. la represents the first information. The function $f_{dec-scen}(\cdot)$ represents the first decoder corresponding to the first scenario-related information, and the first decoder is configured to perform decoding based on the first information. The function $C(\cdot)$ represents an output of the first decoder as a complex coefficient matrix.

In a possible design, the second information includes an eigen-subspace matrix H' of the downlink channel, and the determined eigen-subspace matrix H' of the downlink channel satisfies the following formula:

$$H' = \sum_{j=1}^{J} C(f_{dec}(la, \text{latents}))|_j * U_{1,j} * U_{2,j}^*$$

H' represents the eigen-subspace matrix of the downlink channel. la represents the first information. The function $f_{dec-scen}(\cdot)$ represents the first decoder corresponding to the first scenario-related information, and the first decoder is configured to perform decoding based on the first information. The function $C(\cdot)$ represents an output of the first decoder as a complex coefficient matrix. $C(\cdot)|$ represents a $j^{th}$ complex coefficient in the complex coefficient matrix, j=1, . . . , J, the complex coefficient matrix includes J complex coefficients, J≤K×L, and K and L are positive integers. $U_{2,j}^*$ represents a column vector that is in a basis vector set in a spatial domain direction and that corresponds to $C(\cdot)|_j$, and the basis vector set in the spatial domain direction includes K column vectors. $U_2$-represents conjugate transpose on a column vector that is in a basis vector set in a frequency domain direction and that corresponds to $C(\cdot)|_j$, and the basis vector set in the frequency domain direction includes L column vectors.

In a possible design, the first scenario-related information indicates N probability values, and each of the N probability values corresponds to one scenario. Optionally, a sum of the N probability values is less than or equal to 1.

In a possible design, that the processing unit 1102 determines second information of the downlink channel based on the first scenario-related information and the first information includes: obtaining a second weighting coefficient matrix based on the first scenario-related information, the first information, and a second decoder; and performing space-frequency joint projection inverse transform on a complex coefficient matrix or a complex coefficient vector corresponding to the second weighting coefficient matrix, to determine an eigen-subspace matrix H' of the downlink channel.

In a possible design, the second information includes an eigen-subspace matrix H' of the downlink channel, and the determined eigen-subspace matrix H' of the downlink channel satisfies the following formula:

$$H' = \sum_{k=1}^{K} \sum_{l=1}^{L} C(f_{dec}(la, \text{latents})) * U_{1,k} * U_{2,l}^*$$

H' represents the eigen-subspace matrix of the downlink channel. $U_{1,k}$ represents a $k^{th}$ column vector in a basis vector set in a spatial domain direction, k=1, . . . , K, the basis vector set in the spatial domain direction includes K column vectors, and K is a positive integer. $U_{2,1}^*$ represents conjugate transpose on an $1^{th}$ column vector in a basis vector set in a frequency domain direction, l=1, . . . , L, the basis vector set in the frequency domain direction includes L column vectors, and L is a positive integer. la represents the first information. latents represents the first scenario-related information, indicating a group of probabilities. The function $f_{dec}(\cdot)$ represents the second decoder, and the second decoder is configured to perform decoding based on the first information and the first scenario-related information. The function $C(\cdot)$ represents an output of the first decoder as a complex coefficient matrix.

In a possible design, the second information includes an eigen-subspace matrix H' of the downlink channel, and the determined eigen-subspace matrix H' of the downlink channel satisfies the following formula:

$$H' = \sum_{j=1}^{J} C(f_{dec}(la, \text{latents}))|_j * U_{1,j} * U_{2,j}^*$$

H' represents the eigen-subspace matrix of the downlink channel. la represents the first information. latents represents the first scenario-related information, indicating a group of probabilities. The function $f_{dec}(\cdot)$ represents the second decoder, and the second decoder is configured to perform decoding based on the first information and the first scenario-related information. The function $C(\cdot)$ represents an output of the second decoder as a complex coefficient matrix. $C(\cdot)|_j$ represents a $j^{th}$ complex coefficient in the complex coefficient matrix, j=1, . . . , J, the complex coefficient matrix includes J complex coefficients, J≤K×L, and K and L are positive integers. $U_{1,j}$ represents a column vector that is in a basis vector set in a spatial domain direction and that corresponds to $C(\cdot)|_j$, and the basis vector set in the spatial domain direction includes K column vectors. $U_{2,j}^*$ represents conjugate transpose on a column vector that is in a basis vector set in a frequency domain direction and that corresponds to $C(\cdot)|_j$, and the basis vector set in the frequency domain direction includes L column vectors.

In the second embodiment, the apparatus 1100 may be a terminal device or a module, a chip, or a circuit in a terminal device. The communication unit 1101 is configured to perform sending/receiving-related operations of the UE in the foregoing method embodiment. The processing unit 1102 is configured to perform processing-related operations of the UE in the foregoing method embodiment.

For example, the communication unit 1101 is configured to measure a downlink reference signal received from a network device, to obtain third information of a downlink channel. The processing unit 1102 is configured to determine first information and first scenario-related information of the downlink channel based on the third information. The communication unit 1101 is further configured to send the first information and the first scenario-related information to the network device.

In a possible design, the first scenario-related information indicates identification information of a scenario corresponding to the downlink channel.

In a possible design, that the processing unit 1102 determines first information and first scenario-related information of the downlink channel based on the third information includes: determining the first scenario-related information based on the third information: determining a first encoder in at least one encoder based on the first scenario-related information; and obtaining the first information based on the third information and the first encoder.

In a possible design, the determining the first scenario-related information based on the third information includes: determining the first scenario-related information based on an energy matrix P corresponding to the third information.

In a possible design, the first scenario-related information indicates N probability values, and each of the N probability values corresponds to one scenario. Optionally, a sum of the N probability values is less than or equal to 1.

It should be understood that division of units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware: or some units may be implemented in a form of software invoked by a processing element, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, operations in the foregoing methods or the foregoing units may be implemented by using a hardware integrated logic circuit in the processor element, or may be implemented in the form of software invoked by the processing element.

In an example, a unit in any one of the foregoing apparatuses may be one or more integrated circuits configured to implement the foregoing methods, for example, one or more application-specific integrated circuits (ASICs), one or more microprocessors (DSPs), one or more field programmable gate arrays (FPGAs), or a combination of at least two of these forms of integrated circuits. For another example, when the units in the apparatus may be implemented in a form of scheduling a program by the processing element, the processing element may be a processor, for example, a general-purpose central processing unit (CPU) or another processor that can invoke the program. For another example, the units may be integrated together and implemented in a form of a system-on-a-chip (SOC).

The foregoing unit configured to perform receiving is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing unit configured to perform sending is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 12:
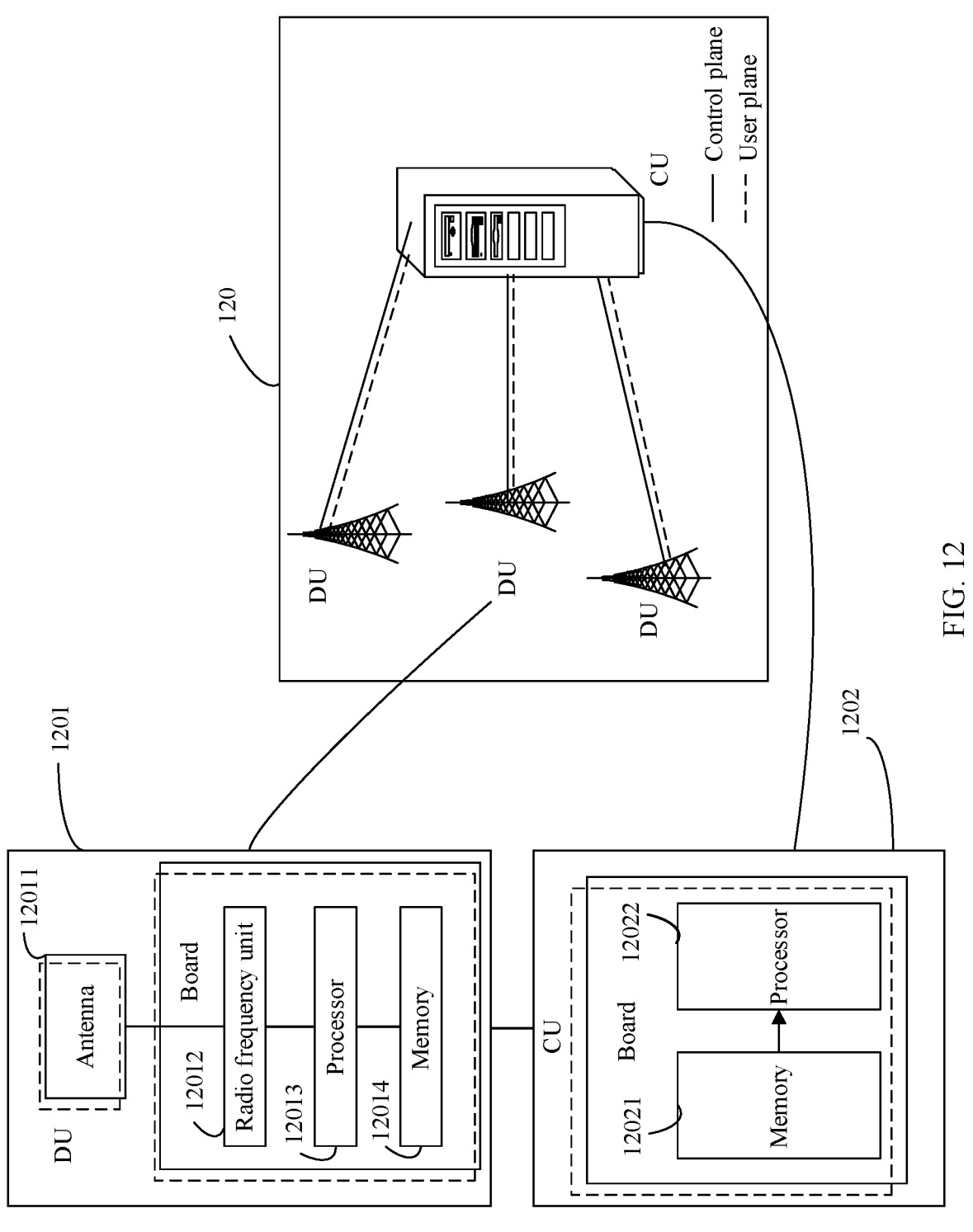
FIG. 12 is a schematic diagram of a structure of a base station according to an embodiment of this application.

FIG. 12 is a schematic diagram of a structure of a network device according to an embodiment of this application. The network device may be an access network device (for example, a base station). An access network device 120 may include one or more DUs 1201 and one or more CUs 1202. The DU 1201 may include at least one antenna 12011, at least one radio frequency unit 12012, at least one processor 12013, and at least one memory 12014. The DU 1201 part is mainly configured to receive and send a radio frequency signal, implement transformation between the radio frequency signal and a baseband signal, and process some basebands. The CU 1202 may include at least one processor 12022 and at least one memory 12021.

The CU 1202 is mainly configured to perform baseband processing, control a network access device, and the like. The DU 1201 and the CU 1202 may be physically disposed together, or may be physically disposed separately, that is, a distributed base station. The CU 1202 is a control center of the access network device, may be referred to as a processing unit, and is mainly configured to complete a baseband processing function. For example, the CU 1202 may be configured to control the access network device to perform an operation procedure related to the access network device in the foregoing method embodiments.

In addition, optionally, the access network device 120 may include one or more radio frequency units, one or more DUs, and one or more CUs. The DU may include at least one processor 12013 and at least one memory 12014. The radio frequency unit may include at least one antenna 12011 and at least one radio frequency unit 12012. The CU may include at least one processor 12022 and at least one memory 12021.

In an instance, the CU 1202 may be formed by one or more boards. A plurality of boards may jointly support a radio access network (such as, a 5G network) of a single access standard, or may separately support radio access networks (such as, an LTE network, a 5G network, or another network) of different access standards. The memory 12021 and the processor 12022 may serve one or more boards. In other words, a memory and a processor may be separately disposed on each board. Alternatively, a plurality of boards may share a same memory and a same processor. In addition, a circuit may further be disposed on each board. The DU 1201 may be formed by one or more boards. A plurality of boards may jointly support a radio access network (such as, a 5G network) of a single access standard, or may separately support radio access networks (such as, an LTE network, a 5G network, or another network) of different access standards. The memory 12014 and the processor 12013 may serve one or more boards. In other words, a memory and a processor may be separately disposed on each board. Alternatively, a plurality of boards may share a same memory and a same processor. In addition, a circuit may further be disposed on each board.

The access network device shown in FIG. 12 can implement processes related to the access network device in the foregoing method embodiments. Operations and/or functions of modules in the access network device shown in FIG. 12 are respectively configured to implement corresponding procedures in the foregoing method embodiments. For details, refer to the descriptions in the foregoing method embodiments. To avoid repetition, detailed descriptions are properly omitted herein.

Figure 13:
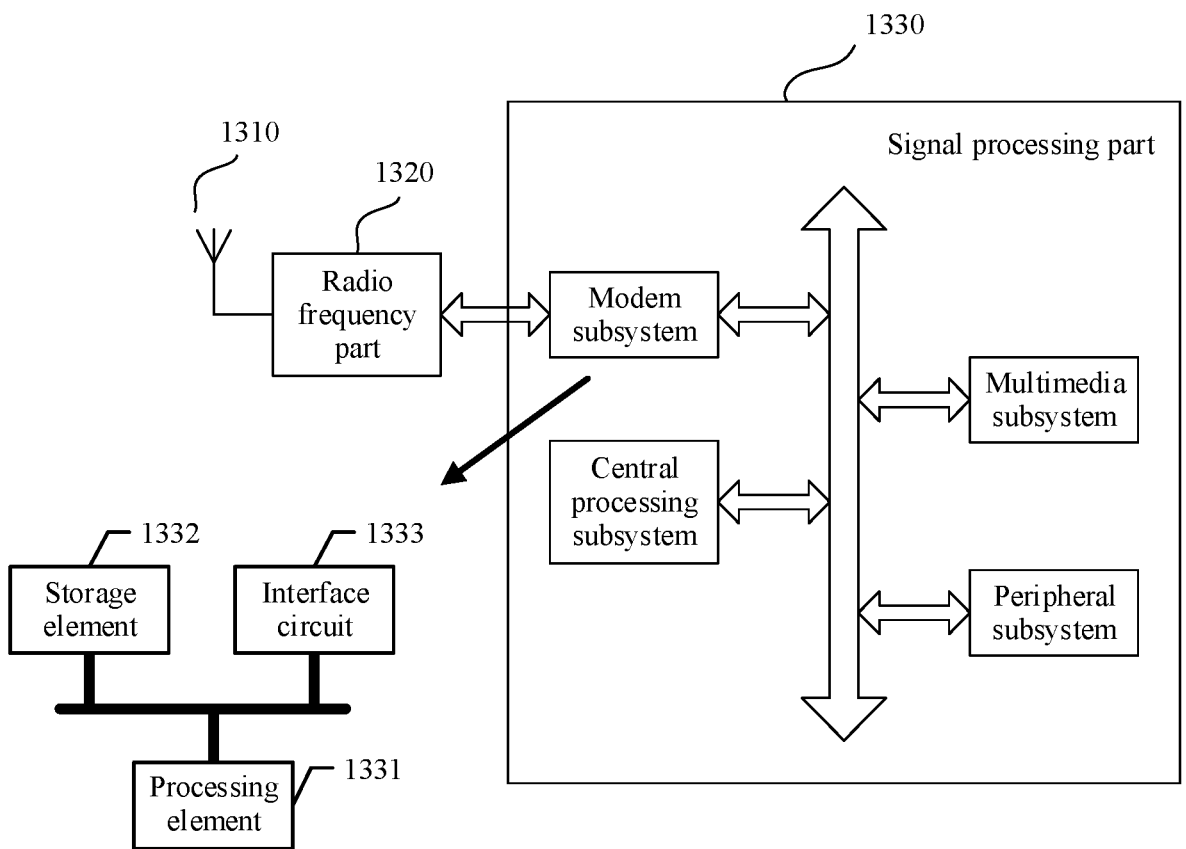
FIG. 13 is a schematic diagram of a structure of a terminal device according to an embodiment of this application.

FIG. 13 is a schematic diagram of a structure of a terminal device according to an embodiment of this application. As shown in FIG. 13, the terminal device includes an antenna 1310, a radio frequency part 1320, and a signal processing part 1330. The antenna 1310 is connected to the radio frequency part 1320. In a downlink direction, the radio frequency part 1320 receives, by using the antenna 1310, information sent by a network device; and sends, to the signal processing part 1330 for processing, the information sent by the network device. In an uplink direction, the signal processing part 1330) processes information of the terminal device, and sends the information of the terminal device to the radio frequency part 1320. The radio frequency part 1320 processes the information of the terminal device, and then sends processed information to the network device by using the antenna 1310.

The signal processing part 1330 may include a modem subsystem, configured to process data at each communication protocol layer. The signal processing part 1330 may further include a central processing subsystem, configured to process an operating system and an application layer that are of the terminal device. In addition, the signal processing part 1330 may further include another subsystem, for example, a multimedia subsystem, or a peripheral subsystem. The multimedia subsystem is configured to control a camera, a screen display, and the like of the terminal device. The peripheral subsystem is configured to connect to another device. The modem subsystem may be a separately disposed chip.

The modem subsystem may include one or more processing elements 1331, for example, include a main control CPU and another integrated circuit. In addition, the modem subsystem may further include a storage element 1332 and an interface circuit 1333. The storage element 1332 is configured to store data and a program. However, a program configured to perform the methods performed by the terminal device in the foregoing methods may not be stored in the storage element 1332, but is stored in a memory outside the modem subsystem, and is loaded and used by the modem subsystem when to be used. The interface circuit 1333 is configured to communicate with another subsystem.

The modem subsystem may be implemented by using a chip. The chip includes at least one processing element and an interface circuit. The processing element is configured to perform the steps of any method performed by the terminal device. The interface circuit is configured to communicate with another apparatus. In an implementation, units of the terminal device that implement the steps in the foregoing methods may be implemented by a program scheduled by a processing element. For example, the apparatus used for the terminal device includes a processing element and a storage element. The processing element invokes a program stored in the storage element, to perform the methods performed by the terminal device in the foregoing method embodiments. The storage element may be a storage element that is located on a same chip as the processing element, that is, the storage element is an on-chip storage element.

In another implementation, the program configured to perform the methods performed by the terminal device in the foregoing methods may be in a storage element located on a different chip from the processing element, that is, the storage element is an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of the types of integrated circuits. The integrated circuits may be integrated together to form a chip.

Units of the terminal device that implement the steps in the foregoing methods may be integrated together, and implemented in a form of SOC. The SOC chip is configured to implement the foregoing methods. At least one processing element and a storage element may be integrated into the chip. The processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by a program invoked by the processing element, and functions of some units are implemented by the integrated circuit.

It can be learned that the foregoing apparatus used for the terminal device may include at least one processing element and an interface circuit. The at least one processing element is configured to perform any method that is performed by the terminal device and that is provided in the foregoing method embodiments. The processing element may perform some or all steps performed by the terminal device, in a first manner, by invoking the program stored in the storage element: or may perform some or all steps performed by the terminal device, in a second manner, by using a hardware integrated logical circuit in the processing element in combination with instructions: or may certainly perform, by combining the first manner and the second manner, some or all steps performed by the terminal device.

The processing element herein is the same as that described above, and may be implemented by using a processor. A function of the processing element may be the same as a function of the processing unit described in FIG. 11. For example, the processing element may be a general-purpose processor, for example, a CPU, or may be one or more integrated circuits configured to implement the foregoing method, for example, one or more ASICs, one or more microprocessors DSPs, one or more FPGAs, or a combination of at least two of the integrated circuit forms. The storage element may be implemented by using a memory. A function of the storage element may be the same as a function of the storage unit described in FIG. 11. The storage element may be a memory, or may be a general name of a plurality of memories.

The terminal device shown in FIG. 13 can implement processes related to the terminal device in the foregoing method embodiments. Operations and/or functions of modules in the terminal device shown in FIG. 13 are configured to implement corresponding procedures in the foregoing method embodiments. For details, refer to the descriptions in the foregoing method embodiments. To avoid repetition, detailed descriptions are properly omitted herein.

Terms "system" and "network" may be used interchangeably in embodiments of this application. "At least one" means one or more, and "a plurality of" means two or more. "And/or" describes an association relationship between associated objects and indicates that three relationships may exist. For example. A and/or B may indicate the following cases: only A exists, both A and B exist, and only B exists, where A and B may be singular or plural. The character "/" generally indicates an "or" relationship between the associated objects. "At least one of the following items (pieces)" or a similar expression thereof indicates any combination of these items, including any combination of singular items (pieces) or plural items (pieces). For example. "at least one of A, B, and C" includes A, B, C, AB, AC, BC, or ABC. In addition, unless otherwise specified, ordinal numbers such as "first" and "second" mentioned in embodiments of this application are used to distinguish between a plurality of objects, but are not intended to limit a sequence, a time sequence, priorities, importance, or the like of the plurality of objects.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a compact disc read-only memory (CD-ROM), and an optical memory) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may alternatively be stored in a computer-readable memory that can instruct a computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An apparatus, comprising one or more circuits, configured to:
   receive first information and first scenario-related information of a downlink channel from a terminal device, wherein the first scenario-related information indicates identification information of at least one scenario corresponding to the downlink channel; and
   determine, by using a first decoder, second information of the downlink channel based on the first scenario-related information and the first information, wherein
   an input of the first decoder is based on the first information and the first scenario-related information; or
   an input of the first decoder is based on the first information, wherein the first decoder corresponds to the first scenario-related information.

2. The apparatus according to claim 1, wherein the one or more circuits are configured to determine the second information of the downlink channel based on the first scenario-related information and the first information by:
   determining the first decoder in at least one decoder based on the first scenario-related information; and
   obtaining the second information of the downlink channel based on the first information and the first decoder.

3. The apparatus according to claim 2, wherein the one or more circuits are configured to obtain the second information of the downlink channel based on the first information and the first decoder by:

obtaining a first weighting coefficient matrix based on the first information and the first decoder; and performing space-frequency joint projection inverse transform on a complex coefficient matrix or a complex coefficient vector corresponding to the first weighting coefficient matrix, to determine the second information.

4. The apparatus according to claim 1, wherein the second information comprises an eigen-subspace matrix H' of the downlink channel, and the eigen-subspace matrix H' of the downlink channel satisfies the following formula:

$$H' = \sum_{k=1}^{K} \sum_{l=1}^{L} C(f_{dec-scen}(la)) * U_{1,k} * U_{2,l}^{*}$$

wherein H' represents the eigen-subspace matrix H' of the downlink channel; $U_{1,k}$ represents a $k^{th}$ column vector in a basis vector set in a spatial domain direction, k=1, . . . , K, the basis vector set in the spatial domain direction comprises K column vectors, and K is a positive integer; $U^{*}_{2,1}$ represents a conjugate transpose of an $l^{th}$ column vector in a basis vector set in a frequency domain direction, l=1, . . . , L, the basis vector set in the frequency domain direction comprises L column vectors, and L is a positive integer; la represents the first information; the function $f_{dec-scen}(\cdot)$ represents the first decoder corresponding to the first scenario-related information, and the first decoder is configured to perform decoding based on the first information; and the function $C(\cdot)$ represents an output of the first decoder as a complex coefficient matrix.

5. The apparatus according to claim 1, wherein the second information comprises an eigen-subspace matrix H' of the downlink channel, and the eigen-subspace matrix H' of the downlink channel satisfies the following formula:

$$H' = \sum_{j=1}^{J} C(f_{dec-scen}(la))|_j * U_{1,j} * U_{2,j}^{*}$$

wherein H' represents the eigen-subspace matrix H' of the downlink channel; la represents the first information; the function $f_{dec-scen}(\cdot)$ represents the first decoder corresponding to the first scenario-related information, and the first decoder is configured to perform decoding based on the first information; the function $C(\cdot)$ represents an output of the first decoder as a complex coefficient matrix; $C(\cdot)|_j$ represents a $j^{th}$ complex coefficient in the complex coefficient matrix, j=1, . . . , J, the complex coefficient matrix comprises J complex coefficients, J≤K×L, and K and L are positive integers; $U_{1,j}$ represents a column vector that is in a basis vector set in a spatial domain direction and that corresponds to $C(\cdot)|_j$, and the basis vector set in the spatial domain direction comprises K column vectors; and $U^{*}_{2,j}$ represents a conjugate transpose of a column vector that is in a basis vector set in a frequency domain direction and that corresponds to $C(\cdot)|_j$, and the basis vector set in the frequency domain direction comprises L column vectors.

6. The apparatus according to claim 1, wherein the first scenario-related information indicates N probability values, wherein each of the N probability values correspond to a scenario.

7. The apparatus according to claim 6, wherein a sum of the N probability values is less than or equal to 1.

8. The apparatus according to claim 1, wherein the one or more circuits are configured to determine second information of the downlink channel based on the first scenario-related information and the first information by:

obtaining a second weighting coefficient matrix based on the first scenario-related information, the first information, and a second decoder; and performing space-frequency joint projection inverse transform on a complex coefficient matrix or a complex coefficient vector corresponding to the second weighting coefficient matrix, to determine an eigen-subspace matrix H' of the downlink channel.

9. The apparatus according to claim 1, wherein the second information comprises an eigen-subspace matrix H' of the downlink channel, and the eigen-subspace matrix H' of the downlink channel satisfies the following formula:

$$H' = \sum_{k=1}^{K} \sum_{l=1}^{L} C(f_{dec}(la, \text{latents})) * U_{1,k} * U_{2,l}^{*}$$

wherein H' represents the eigen-subspace matrix H' of the downlink channel; $U_{1,k}$ represents a $k^{th}$ column vector in a basis vector set in a spatial domain direction, k=1, . . . , K, the basis vector set in the spatial domain direction comprises K column vectors, and K is a positive integer; $U^{*}_{2,1}$ represents a conjugate transpose of an $l^{th}$ column vector in a basis vector set in a frequency domain direction, l=1, . . . , L, the basis vector set in the frequency domain direction comprises L column vectors, and L is a positive integer; la represents the first information; latents represents the first scenario-related information, indicating a group of probabilities; the function $f_{dec}(\cdot)$ represents the second decoder, and the second decoder is configured to perform decoding based on the first information and the first scenario-related information; and the function $C(\cdot)$ represents an output of the second decoder as a complex coefficient matrix.

10. The apparatus according to claim 1, wherein the second information comprises an eigen-subspace matrix H' of the downlink channel, and the eigen-subspace matrix H' of the downlink channel satisfies the following formula:

$$H' = \sum_{j=1}^{J} C(f_{dec}(la, \text{latents}))|_j * U_{1,j} * U_{2,j}^{*}$$

wherein H' represents the eigen-subspace matrix H' of the downlink channel; la represents the first information; latents represents the first scenario-related information, indicating a group of probabilities; the function $f_{dec}(\cdot)$ represents the second decoder, and the second decoder is configured to perform decoding based on the first information and the first scenario-related information; the function $C(\cdot)$ represents an output of the second decoder as a complex coefficient matrix; $C(\cdot)|$ represents a j'h complex coefficient in the complex coefficient matrix, j=1, . . . , J, the complex coefficient matrix comprises J complex coefficients, J≤K×L, and K and L are positive integers; $U_{1,j}$ represents a column vector that is in a basis vector set in a spatial domain direction and that corresponds to $C(\cdot)|_j$, and the basis vector set in the spatial domain direction comprises K column vectors; and $U^*_{2,j}$ represents a conjugate transpose of a column vector that is in a basis vector set in a frequency domain direction and that corresponds to $C(\cdot)|_j$, and the basis vector set in the frequency domain direction comprises L column vectors.

11. The apparatus according to claim 1, wherein the at least one scenario comprises a scenario in which there is a single strong path in two polarization directions.

12. An apparatus, comprising one or more circuits, configured to:

measure a downlink reference signal received from a network device, to obtain third information of a downlink channel;

determine first information and first scenario-related information of the downlink channel based on the third information, wherein the first information is determined by a first encoder, the first scenario-related information indicates identification information of at least one scenario corresponding to the downlink channel, and wherein an input of the first encoder is based on the third information and the first scenario-related information; or an input of the first encoder is based on the third information, wherein the first encoder corresponds to the first scenario-related information; and send the first information and the first scenario-related information to the network device.

13. The apparatus according to claim 12, wherein the one or more circuits are configured to determine the first information and the first scenario-related information of the downlink channel based on the third information by:

determining the first scenario-related information based on the third information;

determining the first encoder in at least one encoder based on the first scenario-related information; and obtaining the first information based on the third information and the first encoder.

14. The apparatus according to claim 12, wherein the one or more circuits are configured to determine the first scenario-related information based on the third information by:

determining the first scenario-related information based on an energy matrix P corresponding to the third information.

15. The apparatus according to claim 12, wherein the first scenario-related information indicates N probability values, wherein each of the N probability values correspond to a scenario.

16. The apparatus according to claim 15, wherein a sum of the N probability values is less than or equal to 1.

17. The apparatus according to claim 12, wherein the at least one scenario comprises a scenario having a rich angle domain and delay domain extension.

18. A communications method, comprising:

receiving first information and first scenario-related information of a downlink channel from a terminal device, wherein the first scenario-related information indicates identification information of at least one scenario corresponding to the downlink channel; and determining, by using a first decoder, second information of the downlink channel based on the first scenario-related information and the first information, wherein an input of the first decoder is based on the first information and the first scenario-related information; or an input of the first decoder is based on the first information, wherein the first decoder corresponds to the first scenario-related information.

19. The method according to claim 18, wherein determining the second information of the downlink channel based on the first scenario-related information and the first information comprises:

determining the first decoder in at least one decoder based on the first scenario-related information; and obtaining the second information of the downlink channel based on the first information and the first decoder.

20. The method according to claim 18, wherein the at least one scenario comprises a line of sight path scenario.

* * * * *